United States Patent
Grant, Jr. et al.

(10) Patent No.: US 8,412,601 B2
(45) Date of Patent: Apr. 2, 2013

(54) METHOD AND SYSTEM TO EVALUATE ANTI-MONEY LAUNDERING RISK

(75) Inventors: Henry W. Grant, Jr., Sherrills Ford, NC (US); Tyler Reynolds, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1932 days.

(21) Appl. No.: 10/711,705

(22) Filed: Sep. 30, 2004

(65) Prior Publication Data

US 2005/0267827 A1      Dec. 1, 2005

Related U.S. Application Data

(60) Provisional application No. 60/521,588, filed on May 28, 2004.

(51) Int. Cl.
    *G06Q 40/00*     (2012.01)
(52) U.S. Cl. ............................... 705/35; 705/38
(58) Field of Classification Search .............. 705/35, 705/38
    See application file for complete search history.

(56) References Cited

U.S. PATENT DOCUMENTS

| 6,912,502 | B1 | 6/2005 | Buddle et al. |
| 2002/0023053 | A1 | 2/2002 | Szoc et al. |
| 2002/0138407 | A1* | 9/2002 | Lawrence et al. ............... 705/38 |

OTHER PUBLICATIONS

PCT International Search Report, PCT/US05/18765, dated Apr. 21, 2006 for corresponding PCT application.
PCT Written Opinion of the International Searching Authority, PCT/US05/18765, dated Apr. 21, 2006 for corresponding PCT Application.

* cited by examiner

*Primary Examiner* — Samica L Norman
(74) *Attorney, Agent, or Firm* — Michael A. Springs; Moore & Van Allen PLLC; Padowithz Alce

(57) ABSTRACT

A method to evaluate anti-money laundering risk may include identifying a person or other legal entity to be evaluated. A country may be selected associated with the person or other legal entity. At least one financial product or financial instrument associated with the person or other legal entity may be selected. The method may also include selecting a customer type associated with the person or other legal entity. A risk rating may be determined based on responses to predetermined criteria related to the selected country, the at least one selected financial product and the selected customer type.

18 Claims, 24 Drawing Sheets

| Search |
| AML Risk Rating |
| Calculation Information |

Associate Info — 302
- Name: Free-form text box - Type Last Name, First Name
- LOB: Drop-down list with (WIM, CCB, GCIB, GTS) — 305
  - 304
  - 306

Customer Name: Free-form text box - Type Last Name, First Name

Country Info — 308, 310
- Primary Country: [dropdown] — 313
- View country detailed information on Discovery

Product Info — 314, 316
- Product Type: [dropdown]
- Available Products: [dropdown]
- 322 — (Submit this product) 318, 320
- Please "submit" at least 1 product and no more than 5.

330 — Selected Products — Score ← 326
⊗
⊗
⊗  } 324
⊗
⊗

Customer Info — 332
- Customer Type: Drop-down option with customer types listed
- 336 — (Submit this customer type) 334
- Please "submit" at least 1 customer type and no more than 2.

344 — Selected Customer Types — Score ← 340
⊗
⊗  } 338

(CALCULATE RISK)   (Reset Form)
346                 347

FIG. 11

AML Risk Rating Report — 1102

Printed: June 6, 2004 — 1100

| Date | Element Type | Element | Previous Data | Current Data | Party Responsible |
|---|---|---|---|---|---|
| 6/25/04 | Country | Iran | NCJ Question: Yes | NCJ Question: No | |

[Print] [Export to PDF]

FIG. 12

| FIG. 12A |
|---|
| FIG. 12B |

Party to 1988 UN Convention: Yes ▷ —1232
Quality of local laws and regulations: Answers ▷ —1234
Level of government support: Answers ▷ —1236
Strength of the banking industry: Answers ▷ —1238
Quality of banking regulation / oversight: Answers ▷ —1240
Financial Institution Risk Rating: Answers ▷ —1242

Country Notes —1244

Last Updated By [Associate Name] —1252  Last Approved By [Associate Name] —1256
Last Updated Date [Date] —1254  Last Approved Date [Date] —1258
[Delete] —1246  [Save Changes] —1248  [Approve Changes] —1250

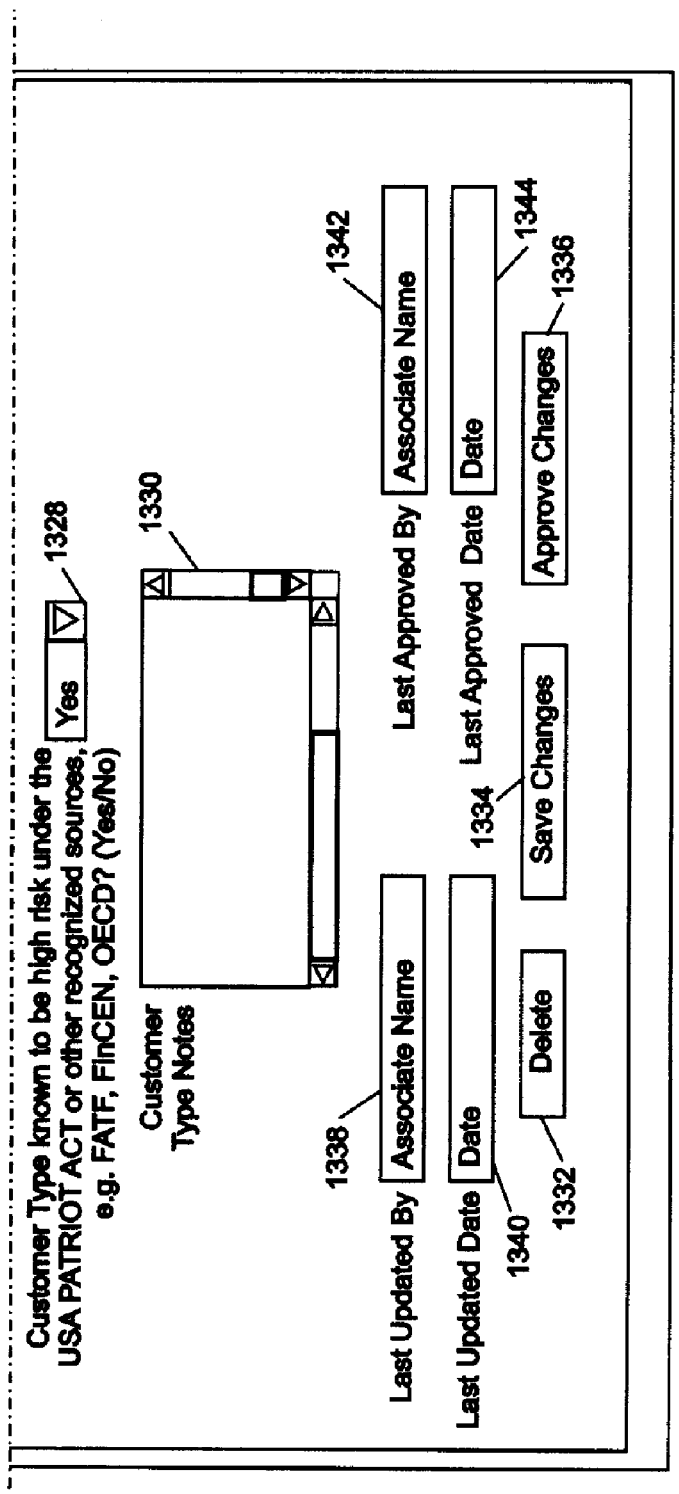
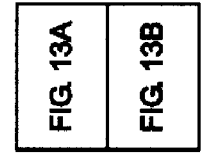
FIG. 13B
FIG. 13

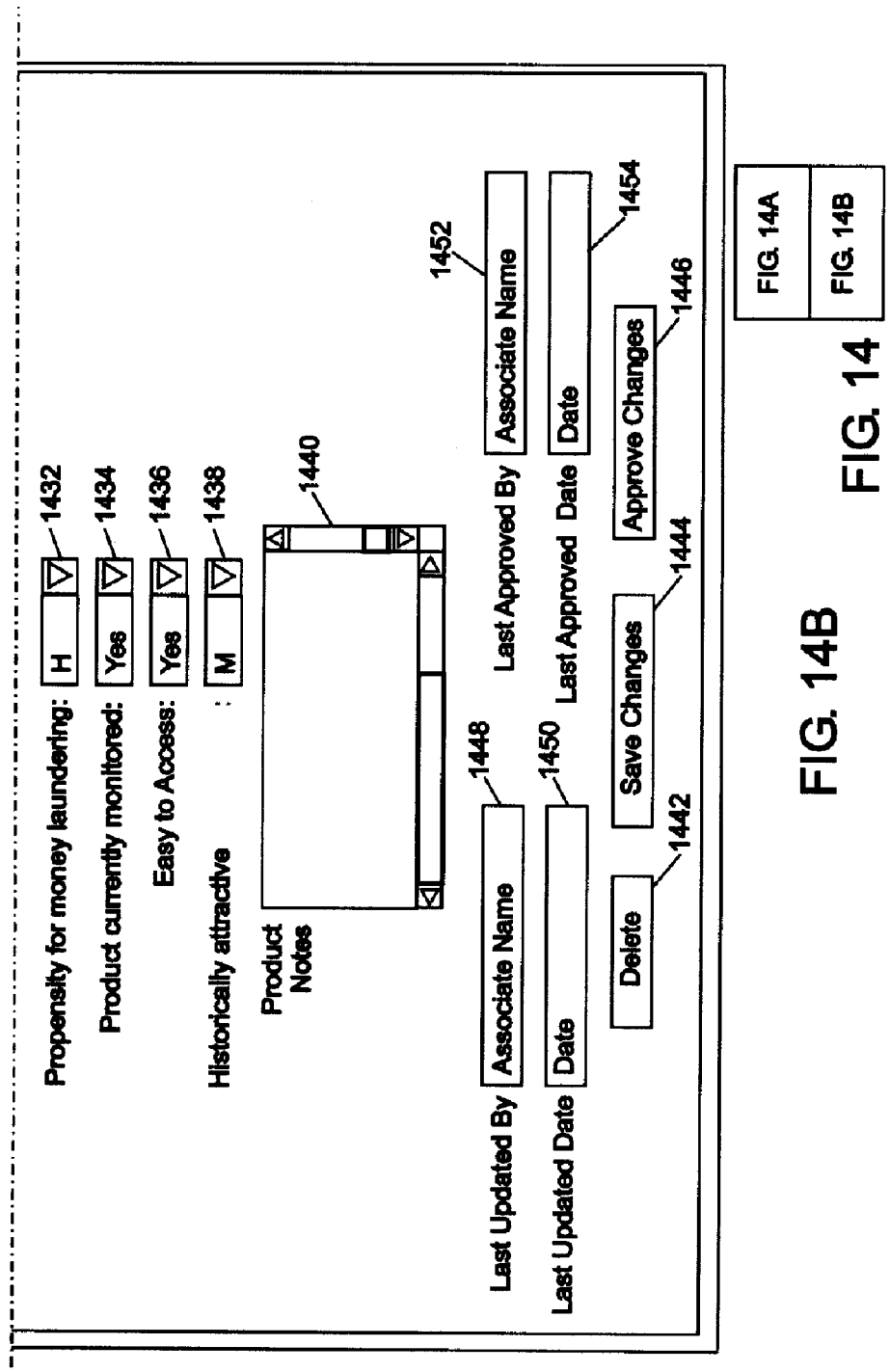

Intl Narcotics Strategy Report 100%

| | Answer | Score |
|---|---|---|
| X | <No Rating> | 3.00 |
| X | Concern | 2.00 |
| X | Monitored | 1.00 |

Member of FATF 100%

| | Answer | Score |
|---|---|---|
| X | Applied for membership | 2.00 |
| X | No | 3.00 |
| X | Yes | 1.00 |

Government Support 100%

| | Answer | Score |
|---|---|---|
| X | <No Rating> | 3.00 |
| X | Sporadic law enforcement... | 3.00 |
| X | Vigorously enforced law & reg.. | 1.00 |

Strength of Banking Industry 100%

| | Answer | Score |
|---|---|---|
| X | <No Rating> | 3.00 |
| X | Growth is safe & sound... | 2.00 |
| X | Mature and Strong | 1.00 |

Financial Institution Risk Rating 100%

| | Answer | Score |
|---|---|---|
| X | <No Rating> | 3.00 |
| X | 1-6 | 1.00 |
| X | 7-8 | 2.00 |

Save Changes

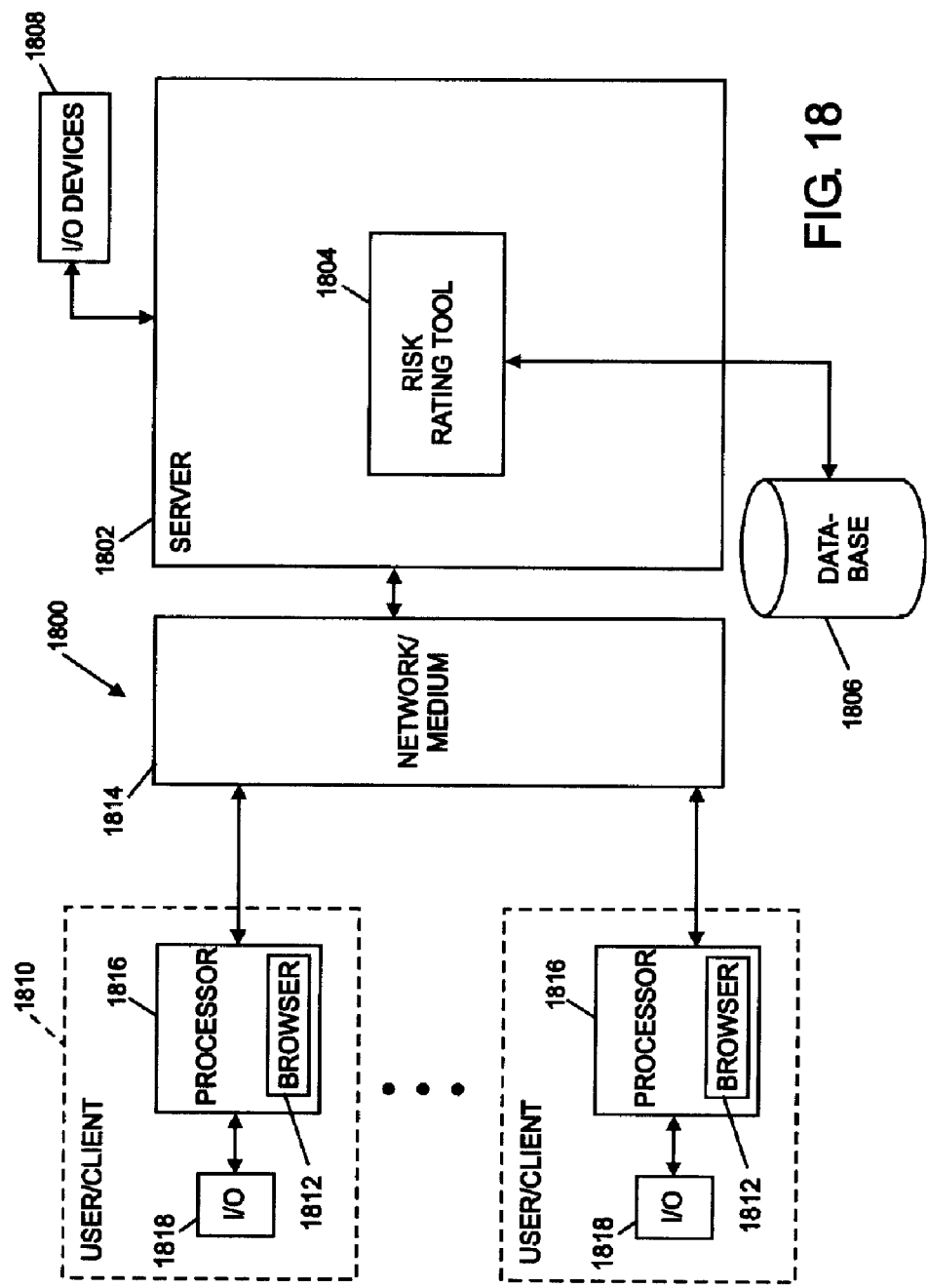

US 8,412,601 B2

METHOD AND SYSTEM TO EVALUATE ANTI-MONEY LAUNDERING RISK

BACKGROUND OF INVENTION

The present invention relates to financial systems, products or the like and more particularly to a method and system to evaluate illegal use of financial systems, products or the like, such as money laundering or similar schemes.

With the use of financial systems, products and the like by radical persons and other unlawful persons to finance and support their activities, governments have promulgated guidelines and regulations to detect and monitor use of such systems and products. Compliance with these governmental guidelines and regulations can impose significant burdens on financial institutions. Monitoring every transaction for the possibility of use with respect to illicit or illegal activity can be an insurmountable task. Additionally, an audit trail may be needed to show compliance with governmental laws and regulations or institutional directives and policies. There may also be a need to document why certain actions were taken or not taken or justification for a certain level of scrutiny placed on various customers. There may also be issues with respect to only profiling particular customers so additional basis or criteria for monitoring certain customers or taking particular actions may be needed.

SUMMARY OF INVENTION

In accordance with an embodiment of the present invention, a method to evaluate anti-money laundering risk may include calculating a risk rating based on a set of values. Each value may be assigned to one of a plurality of different possible or selectable responses or answers for each of a multiplicity of criteria or questions associated with a group including at least one of a selected country, a selected financial product or investment, and a selected customer type.

In accordance with another embodiment of the present invention, a method to evaluate anti-money laundering risk may include identifying a person or other legal entity to be evaluated. A country may be selected associated with the person or other legal entity. At least one financial product or financial instrument associated with the person or other legal entity may be selected. The method may also include selecting a customer type associated with the person or other legal entity. A risk rating may be determined based on responses to predetermined criteria or questions related to the selected country, the at least one selected financial product and the selected customer type.

In accordance with another embodiment of the present invention, a system to evaluate anti-money laundering may include a server. A risk rating tool or program may be operable on the server to evaluate anti-money laundering risk. In one embodiment of the present invention, the risk rating tool may be adapted to determine a risk rating based on responses to predetermined criteria related to a selected country, at least one selected financial institution and a selected customer type.

In accordance with another embodiment of the present invention, a method for making a system to evaluate anti-money laundering risk may include providing a server and providing a risk rating tool or software program operable on the server.

In accordance with another embodiment of the present invention, a computer-readable medium having computer-executable instructions for performing a method that may include calculating a risk rating based on a set of values. Each of the values may be assigned to one of a plurality of different possible or selectable responses or answers for each of a multiplicity of criteria or questions associated with a group including at least one of a selected country, a selected financial product or investment, and a selected customer type.

BRIEF DESCRIPTION OF DRAWINGS

FIG. 11 is an example of a GUI, screenshot, web page or the like that may be presented by an AML Risk Rating Tool, computer program or method, such as the method of FIG. 1, to an authorized user or administrator illustrating an AML Risk Rating Report of any changes, additions, updates or the like from FIG. 10 in accordance with an embodiment of the present invention.

FIGS. 12A and 12B (collectively FIG. 12) are an example of a GUI, screenshot, web page or the like illustrating a form with drop down selection lists for adding, updating or editing answers or responses to questions or criteria related to a country as part of an AML Risk Rating Tool or computer program in accordance with an embodiment of the present invention.

FIGS. 13A and 13B (collectively FIG. 13) are an example of a GUI, screenshot, web page or the like illustrating a form with drop down selection lists for adding, updating or editing answers or responses to questions or criteria related to customer types as part of an AML Risk Rating Tool or computer program in accordance with an embodiment of the present invention.

FIGS. 14A and 14B (collectively FIG. 14) are an example of a GUI, screenshot, web page or the like illustrating a form with drop down selection lists for adding, updating or editing answers or responses to questions or criteria related to products or product types as part of an AML Risk Rating Tool or computer program in accordance with an embodiment of the present invention.

FIGS. 15A and 15B (collectively FIG. 15) are an example of a GUI, screenshot, web page or the like for updating or editing responses or answers to questions or criteria associated with a country, a weighting factor for each question or criteria, and scores or values for each response or answer associated with an AML Risk Rating Tool or computer program in accordance with an embodiment of the present invention.

FIGS. 17A and 17B (collectively FIG. 17) are an example of a GUI, screenshot, web page or the like for updating or editing responses or answers to questions or criteria associated with a product, a weighting factor for each question or criteria, and scores or values for each response or answer associated with an AML Risk Rating Tool or program in accordance with an embodiment of the present invention.

FIG. 18 is a block schematic diagram of an example of a system to evaluate anti-money laundering (AML) risk or the like in accordance with an embodiment of the present invention.

DETAILED DESCRIPTION

The following detailed description of preferred embodiments refers to the accompanying drawings which illustrate specific embodiments of the invention. Other embodiments having different structures and operations do not depart from the scope of the present invention.

Figure 1:
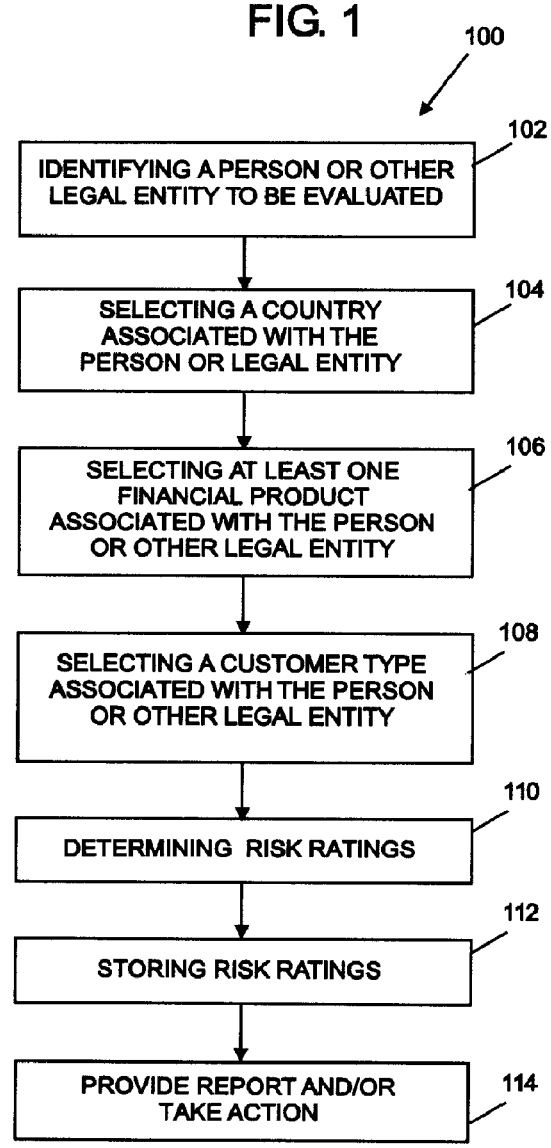
FIG. 1 is a flow chart of an example of a method to evaluate anti-money laundering (AML) risk or the like in accordance with an embodiment of the present invention.

FIG. 1 is a flow chart of an example of a method 100 to evaluate anti-money laundering (AML) risk or risk of similar activity in accordance with an embodiment of the present invention. Money laundering may involve any conduct or acts designed in whole or in part to conceal or disguise the nature, location, source, ownership or control of money, money equivalents, financial instruments or the like to avoid any transaction reporting requirements under state or federal law or to disguise the fact that the money was acquired by illegal means or may be used for illegal means. Money laundering as used herein may also include but is not necessarily limited to any illegal activity involving money, money equivalents, financial instruments, financial transactions or the like. Anti-money laundering may include any activity designed to detect, monitor or thwart money laundering activity or related activity such as that described above. AML risk or risk rating is a measure that may assist in determining if additional steps or actions may be appropriate to detect, monitor or thwart money laundering or similar or related activity.

Figure 3:
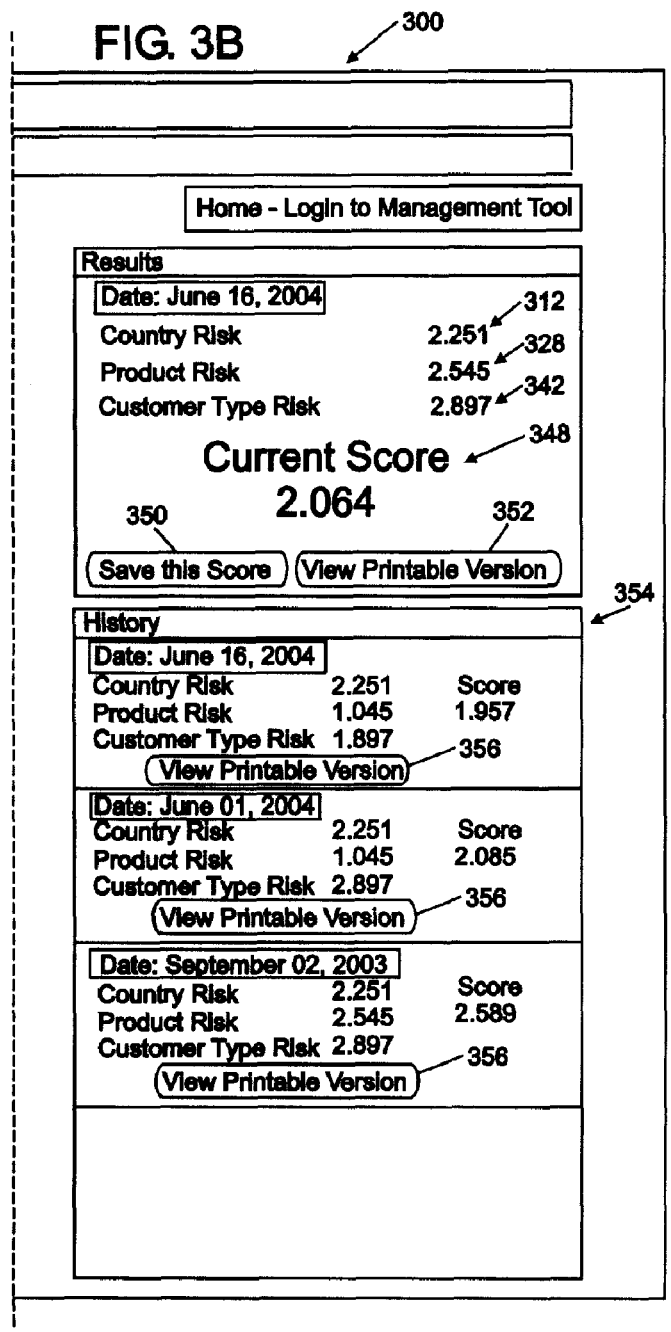
FIG. 3A is an example of a GUI, screenshot, web page or the like that may be presented by an AML Risk Rating Tool, computer program or method, such as the method of FIG. 1, to a user for entering or selecting information associated with a person, company or other legal entity to evaluate anti-money laundering risk in accordance with an embodiment of the present invention.
FIG. 3B is an example of a GUI, screenshot, web page or the like that may be presented by an AML Risk Rating Tool, computer program or method, such as the method of FIG. 1, to a user illustrating the results of an AML risk rating calculation based on the selected information entered in the GUI of FIG. 3A in accordance with an embodiment of the present invention.

The method 100 may form at least a portion of an AML Risk Rating Tool or computer program in accordance with an embodiment of the present invention. In block 102, a person, company or other legal entity may be identified to be evaluated for AML risk or similar suspicious or illegal activity. In block 104, a country associated with the person or other legal entity may be entered or selected. The country may be the primary country or any country where the person or other legal entity is doing business. In block 106, at least one financial product, investment or financial instrument or the like associated with the person or other legal entity may be entered or selected. The financial product or investment instrument may be a product or financial instrument that the person or legal entity uses or trades in. Examples of financial products or financial instruments will be described in more detail with respect to FIG. 3A. In block 108, a customer type associated with the person or other legal entity may be entered or selected. Examples of different customer types will be described in more detail with respect to FIG. 3A.

In block 110 a risk rating may be determined. The risk rating may be a number that represents an indication or estimate of the likelihood that the person or other legal entity being evaluated may be involved in money laundering or related suspicious or illegal activities. Determining a risk rating may involve calculating a risk rating based on a set of values, scores or weightings. Each score or value may be assigned to one of a plurality of different possible or selectable responses or answers for each of a multiplicity of criteria or questions associated with a group including at least one of a selected country (block 104), a selected financial product or investment (block 106), and a selected customer type (block 108). Calculating the risk rating may involve calculating an average of the scores or values or a weighted average of the scores or values. Each question or criteria associated with the selected country, financial product or investment and selected customer type may have a selected or assigned weighting used in calculating the risk rating for a customer. Separate risk ratings may be calculated or determined for each of the selected country, overall customer types selected, overall products selected and a relationship risk rating that may involve an average of the other risk ratings. An example of determining the risk ratings is described in more detail below.

In block 112, the risk ratings associated with a person or other legal entity, selected countries, selected customer types and selected products may be stored for further analysis or reporting. Risk rating may change over a period of time and may be calculated at different times. A history of the risk rating calculations for a customer may be stored and analyzed for any trends or for other purposes. In block 114, a report may be provided or presented to the user of the risk rating and the factors that may have been involved in determining the rating. Further analysis may also be performed on the risk rating data, such as tracking trends with respect to certain countries, financial products, customer types or the like. Additionally, other actions may be taken dependent upon the level of the risk ratings and state and federal laws and regulations, the policies of the financial institution or other entity using the method 100 of the anti-money laundering Risk Rating Tool or computer program.

Figure 2:
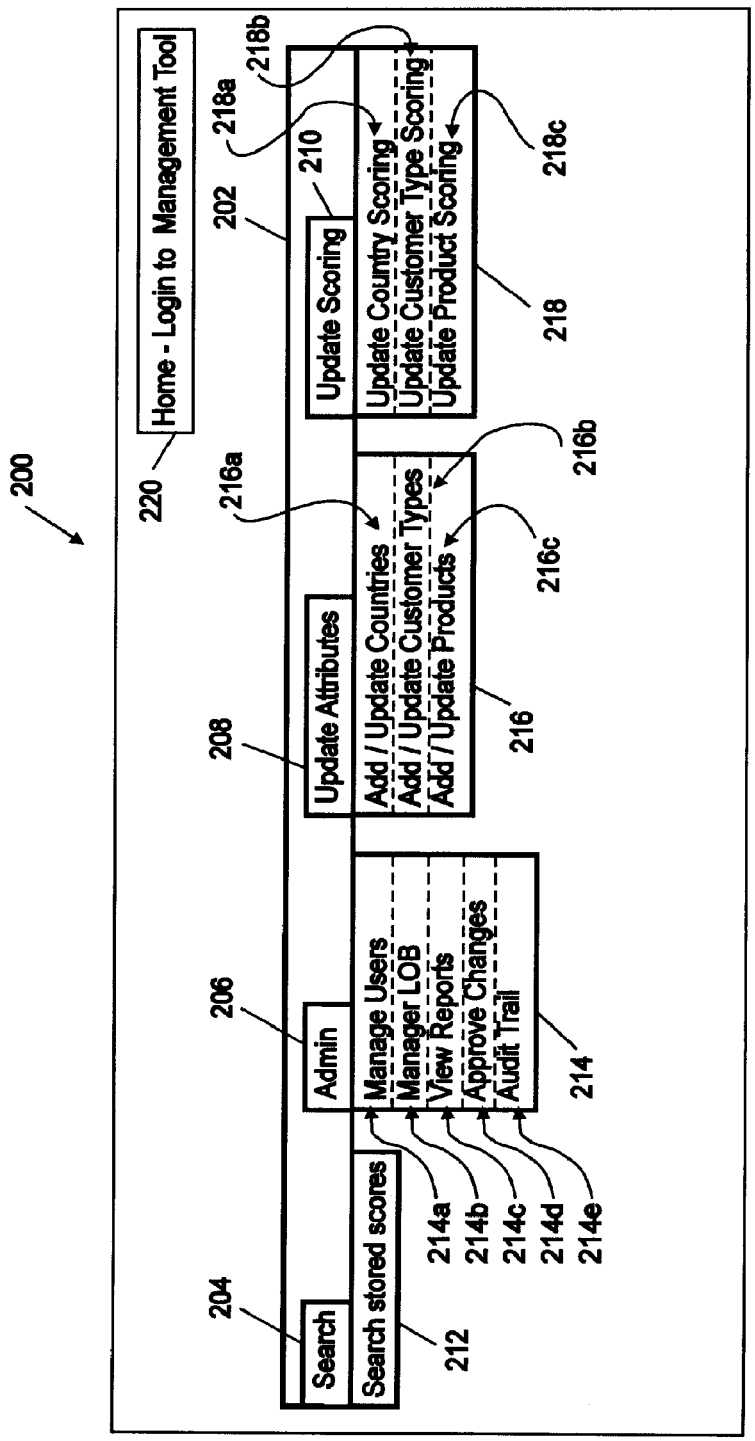
FIG. 2 a graphical user interface (GUI), screenshot, web page or the like of an exemplary menu structure that may be presented by an AML Risk Rating Tool, computer program or method, such as the method of FIG. 1, to a user for operation or use of the AML Risk Rating Tool in accordance with an embodiment of the present invention.

FIG. 2 is a graphical user interface (GUI) 200, screenshot, web page or the like of an exemplary menu structure 202 that may be presented by an AML Risk Rating Tool, system, computer program or method, such as the method of FIG. 1, to a user for operation or use of the AML Risk Rating Tool in accordance with an embodiment of the present invention. The menu structure 202 may include a "Search" tab 204 to present a drop down list of search options 212, an "Admin" tab 206 to present a drop down list of administrative options 214, an "Update Attribute" tab 208 to present a drop down list of update attribute options 216, and an "Update Scoring" tab 210 to present a drop down list of update scoring options 218. Other appropriately descriptive heading labels may be used for the tabs 204-210 and for the selectable menu options 212-218, and the invention is not intended to be limited to the specific labels or legends illustrated or described herein. The menu options 212-218 may provide links or access to other GUIs, screenshots or web pages for performing specific operations or functions related to the AML Risk Rating Tool or system as will be described in more detail herein. The links may be activated by operating a computer pointing device, such as a mouse or the like, and clicking on the desired tab and option.

The search option 212 may be accessed by any user without logging into the tool. The other options 214, 216 and 218 may require login by an authorized user or administrator. The authorized user or administrator may login by clicking on a "Login" radio button 220 or the like. The "Login" radio button 220 may link to a simplified sign-on (SSO) or similar screen.

FIG. 3A is an example of a GUI 300, screenshot, web page or the like that may be presented by an AML Risk Rating Tool, system or computer program, such as the method 100 of FIG. 1, to a user for entering or selecting information associated with a person, company or other legal entity to evaluate anti-money laundering risk or the like in accordance with an embodiment of the present invention. The GUI 300 may be accessed by clicking or activating the "Search" tab 204 in GUI 200 (FIG. 2). A name or identity of an associate or user of the AML Risk Rating Tool may be entered in block or line 302. A line of business (LOB) may be entered or selected from a drop list in box or line 304. The drop down selection list of available LOBs in the AML Risk Rating Tool or system may be displayed for selection in response to operating an arrow 305 associated with box 304 by clicking a computer pointing device or the like on the arrow 305. A customer name or identity of a person or company may be entered in the GUI 300 in box or line 306. In box or line 308, a primary country of interest with respect to the person or company entered in box 306 may be entered or selected. A drop down selection list of countries available in the AML Risk Rating Tool may be displayed for selection in response to operating an arrow 310 by clicking a computer pointing device or the like on the arrow 310. In the embodiment of the present invention illustrated in FIG. 3A, only a single country may be selected. A country risk rating 312 for the country selected may be displayed in GUI 300 (FIG. 3B) or in a separate results screen shot. A link 313 may be provided to a memory location or site on a computer system or network containing details related to how the country risk rating 312 was determined and other information related to the country in box 308.

In box 314, a product type may be entered or selected from a drop down selection list. The drop down list may be displayed or presented by operating or clicking on an arrow 316 associated with the box or line 314 with a computer pointing device or the like. The AML Risk Rating Tool may include any type of financial investment product, financial instrument or the like. Examples of different product types may include capital markets, cash management services, collections, consumer foreign exchange, credit products, demand deposit accounts, global bank notes, lease products, letters of credit, monetary instruments, foreign trust and the like. In box 318, a specific product may be entered or selected from a drop down selection list. The drop down selection list may be displayed or presented by operating or clicking on an arrow 320 associated with the box 318 with a computer pointing device. Depending upon the product type selected in box or line 314, different products may be contained in the drop down selection list for the products in box 318. Examples of different products, financial instruments or the like may include commercial paper programs, commodity derivatives, foreign exchange transactions, options, debt instruments, securities, government obligations or the like. In accordance with one embodiment of the present invention, up to about five different products may be submitted for the AML risk rating evaluation. The different products may be submitted by operating or clicking on a radio button that may be labeled "Submit this product" or other descriptive legend with a computer pointing device or the like. The products selected may be displayed or presented in boxes 324 along with a risk score 326 or value associated with each selected product. The product risk scores 326 or values may be used to calculate an overall product risk rating 328 that may be displayed in GUI 300 (FIG. 3B) or in a separate GUI or screenshot. A selected product may be deleted from one of boxes 324 by activating an "X" radio button 330 or delete key associated with the selected product. In the embodiment of the present invention illustrated in FIG. 3A, at least one product must be selected but no more than five. Other embodiments of the present invention may have different requirements or parameters as to the number of products that may be selected.

In box 332, a customer type may be entered or selected from a drop down selection list. The drop down selection list may be displayed by operating an arrow 334 associated with box or line 332. The AML Risk Rating Tool may include any sort of customer type. Examples of different customer types that may be included in the drop down selection list may be all consumers that have been customers less than one year, all consumers who have been customers more than one year, associations and non-profit entities, corporations, correspondent banks, financial services businesses, foreign governments, foreign/external corporations international private banking clients, limited liability companies, and the like. In accordance with one embodiment of the present invention, up to two different customer types may be submitted by highlighting or selecting a customer type in the drop down list and then operating a radio button 336 that may be labeled "Submit this customer type" or a similar descriptive label. The different customer types selected may be displayed in boxes 338 along with a risk score or value 340 associated with each customer type. The customer type risk scores 340 or values may be used to calculate an overall customer type risk rating 342 that may be displayed in GUI 300 (FIG. 3B) or a separate GUI or screen shot. A selected customer type in one of boxes 338 may be deleted by activating or clicking on an "X" radio button 336 or delete key associated with each one of the selected customer types in boxes 338. In the embodiment of the present invention illustrated in FIG. 3A, at least one customer type must be selected and no more than two. Other embodiments may have different parameters or requirements.

After entering or selecting the information in page or GUI 300, a radio button 346 that may be labeled "Calculate Risk" may be operated by clicking with a computer pointing device or the like. Predetermined boxes or sections may be highlighted or otherwise identified in GUI 300 to indicate entries or selections that need to be made in order to calculate an overall risk in accordance with at least one embodiment of the present invention. The risk rating may then be calculated as described below and presented to the user or requester as illustrated in FIG. 3B. Before calculating the risk ratings, the form or GUI 300 may be reset by operating or clicking on a radio button 347 that may be labeled "Reset Form." The risk rating results may be presented in the same GUI 300 or page or in a separate GUI or page. As previously discussed, the AML Risk Rating Tool may determine and present a risk rating for the selected country or "Country Risk" 312, an overall product risk rating or "Product Risk" 328, an overall customer risk rating or "Customer Risk" 342 and a combined risk rating or "Current Score" 348 as illustrated in FIG. 3B. The combined risk rating or "Current Score" 348 may be an average of the country risk 312, product risk 328 and customer type risk 342. The overall product risk rating 328 may be an average risk rating or weighted average risk rating for all of the products selected and submitted in boxes 324 (FIG. 3A), and the overall customer type risk rating 342 may be an average risk rating or weighted average risk rating for all of the customer types selected and submitted in boxes 338 (FIG. 3A).

Figure 4:
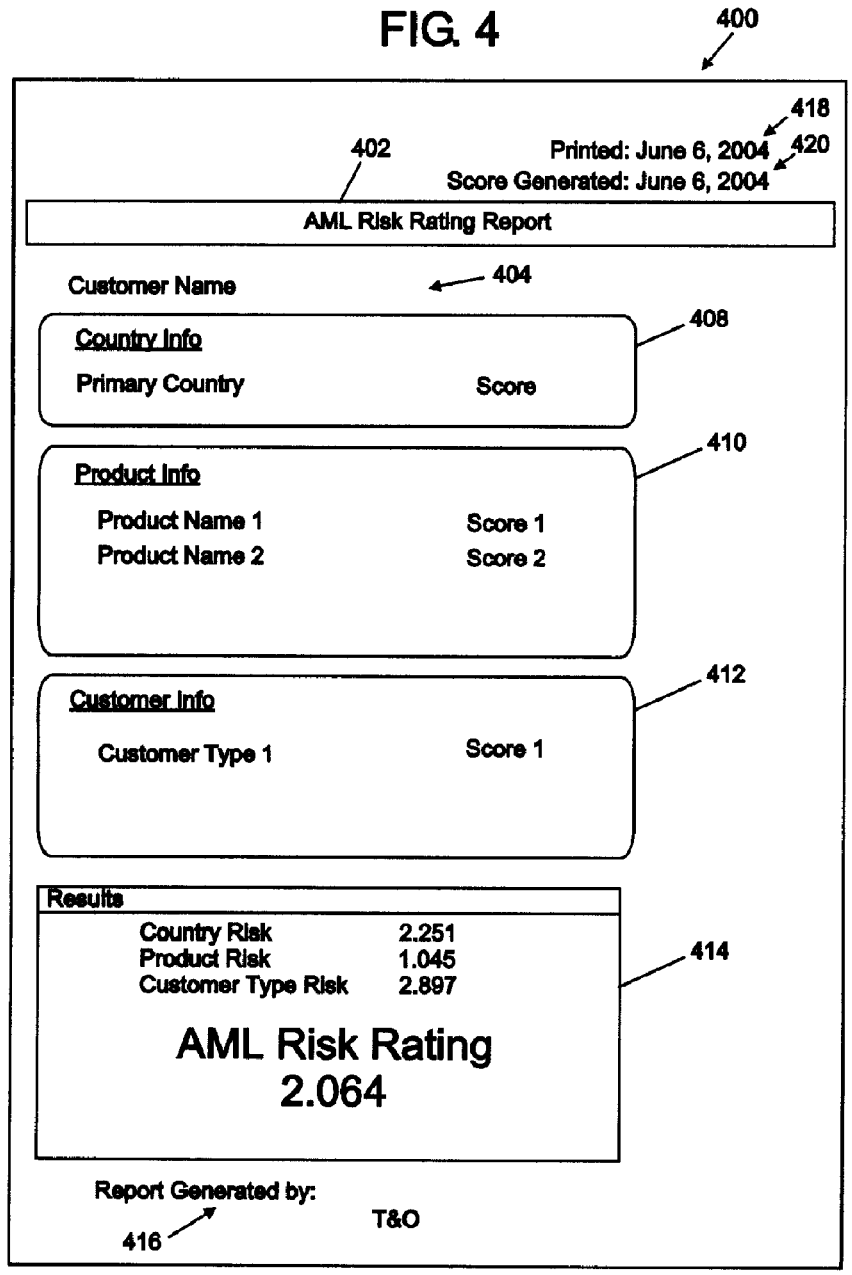
FIG. 4 is an example of a GUI, screenshot, web page or the like that may be presented by an AML Risk Rating Tool, computer program or method, such as the method of FIG. 1, to a user illustrating an example of an AML Risk Rating Report in accordance with an embodiment of the present invention.

The scores or risk ratings 312, 328, 342 and 348 may be displayed with at least 3 decimal places. The results or risk ratings may be blank initially and then pulled from a table or other temporary memory in a computer system or network in response to the results or record being saved by a user operating or clicking on a "Save this Score" radio button 350 with a computer pointing device or the like. All parameters used to calculate the scores or risk ratings and all free-form fields in GUI 300 may be saved in association with the risk ratings or scores in a predetermined memory location or database in a computer system or network in response to operation of the "Save this Score" radio button 350. The new score or risk rating may be printed in a report by operating a radio button 352 that may be labeled "View Printable Version" or the like. FIG. 4 is an example of a GUI 400, screenshot, web page or the like that may be presented to a user by an AML Risk Rating Tool, computer program or method, such as the method of FIG. 1, illustrating an example of an AML Risk Rating Report 402 in accordance with an embodiment of the present invention. The report 402 may indicate the customer name or identity 404. The report 402 may include the selected primary country and associated score or risk rating 408. The Report may also present the selected product names and associated scores or risk ratings 410 and the selected customer types and associated score 412. A summary of the overall results 414 may also be presented in GUI 400, as well as the associate or user 416 and line of business (LOB) who requested or generated the report 402.

Referring back to FIG. 3B, as previously discussed, risk ratings and scores may change from time-to-time because of changing conditions related to a country or changes related to a product, product type or customer type. Accordingly, scores or risk ratings may be calculated at different times and saved to form a history 354 that may be displayed in GUI 300 (FIG. 3B) or in a separate GUI or page. The history 354 may be used to observe trends or for other analysis. Any of the results in the history 354 may be printed or displayed in a printable version by operating or clicking on an associated radio button 356 that may be labeled "View Printable Version" or a similar descriptive label. The printable version may be similar to the AML Risk Rating Report 402 illustrated in FIG. 4. The report 402 may include an indication 418 when the report 402 was printed and an indication 420 when the report was generated or the scores calculated.

Figure 5:
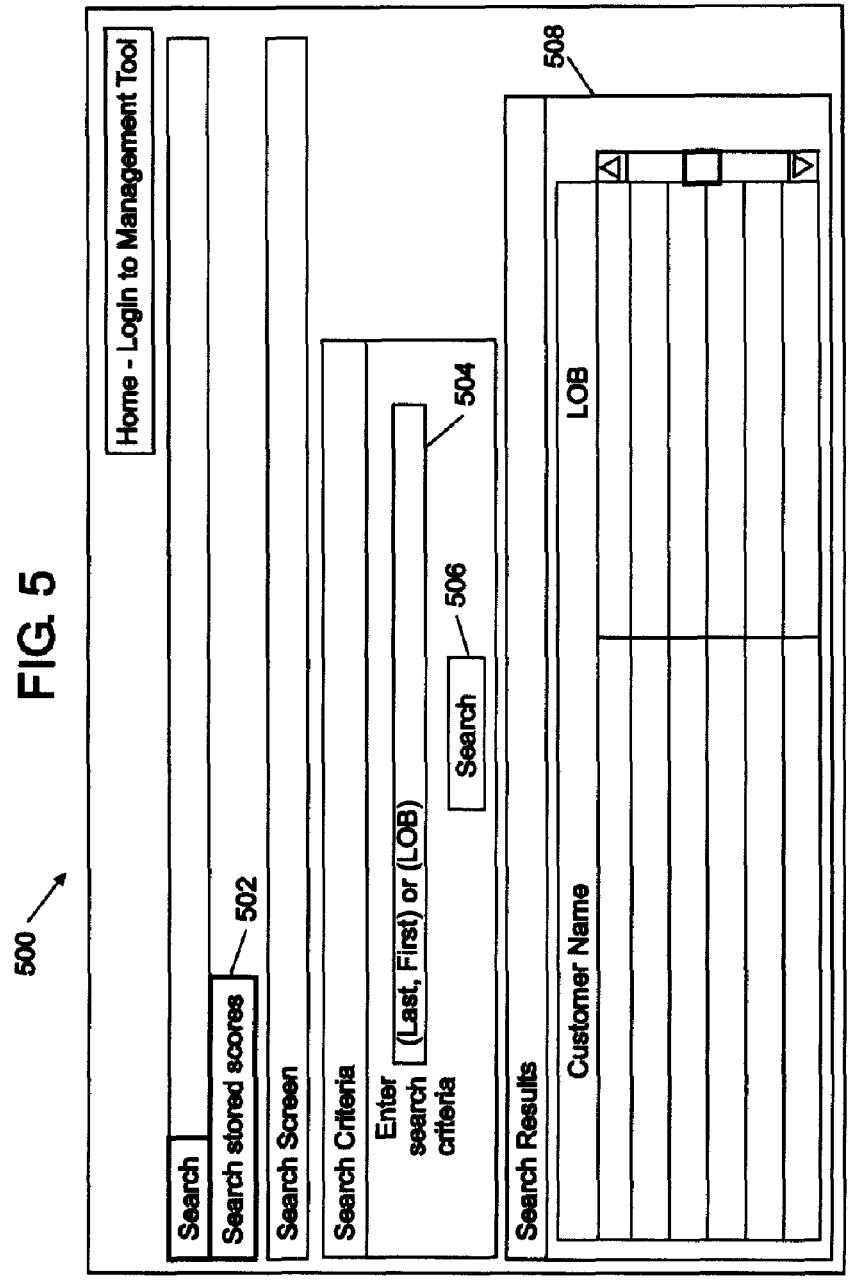
FIG. 5 is an example of a GUI, screenshot, web page or the like that may be presented by an AML Risk Rating Tool, computer program or method, such as the method of FIG. 1, to a user for searching for stored AML Risk Rating scores related to a customer or line of business (LOB) in accordance with an embodiment of the present invention.

FIG. 5 is an example of a GUI 500, screenshot, web page or the like that may be presented by an AML Risk Rating Tool, computer program or method, such as the method of FIG. 1, to a user for searching for stored AML Risk Rating scores related to a customer or line of business (LOB) in accordance with an embodiment of the present invention. The GUI 500 may be accessed or displayed in response to a user activating or clicking on the search option 212 that may be labeled "Search stored scores" or the like in GUI 200 (FIG. 2). The "Search stored scores" option 212 may correspond to "Search stored scores" option 502 in GUI 500 (FIG. 5). In box or line 504, a user may enter search criteria, such as a customer name or identity, a line of business (LOB) or the like. After entering the search criteria in box 504, a radio button 506 that may be labeled "Search" may be activated or clicked on using a computer pointing device or the like. Any stored customer names or identities and LOBs may be displayed in a section 508 of GUI 500 that may be labeled "Search Results" or the like. If there are no stored customers or LOBs matching the search criteria in box 504, a message may be displayed in section 508 indicating no match or results. If customer names or LOBs are found and displayed in section 508, the customer name or LOB may be a link to the to a main calculation page or GUI 300 to display previously submitted or selected data associated with the customer or LOB. Changes may be made by adding or forming a new record using GUI 300 rather than updating the current record or results. The current record or results may then form part of the history 354 (FIG. 3B).

Figure 6:
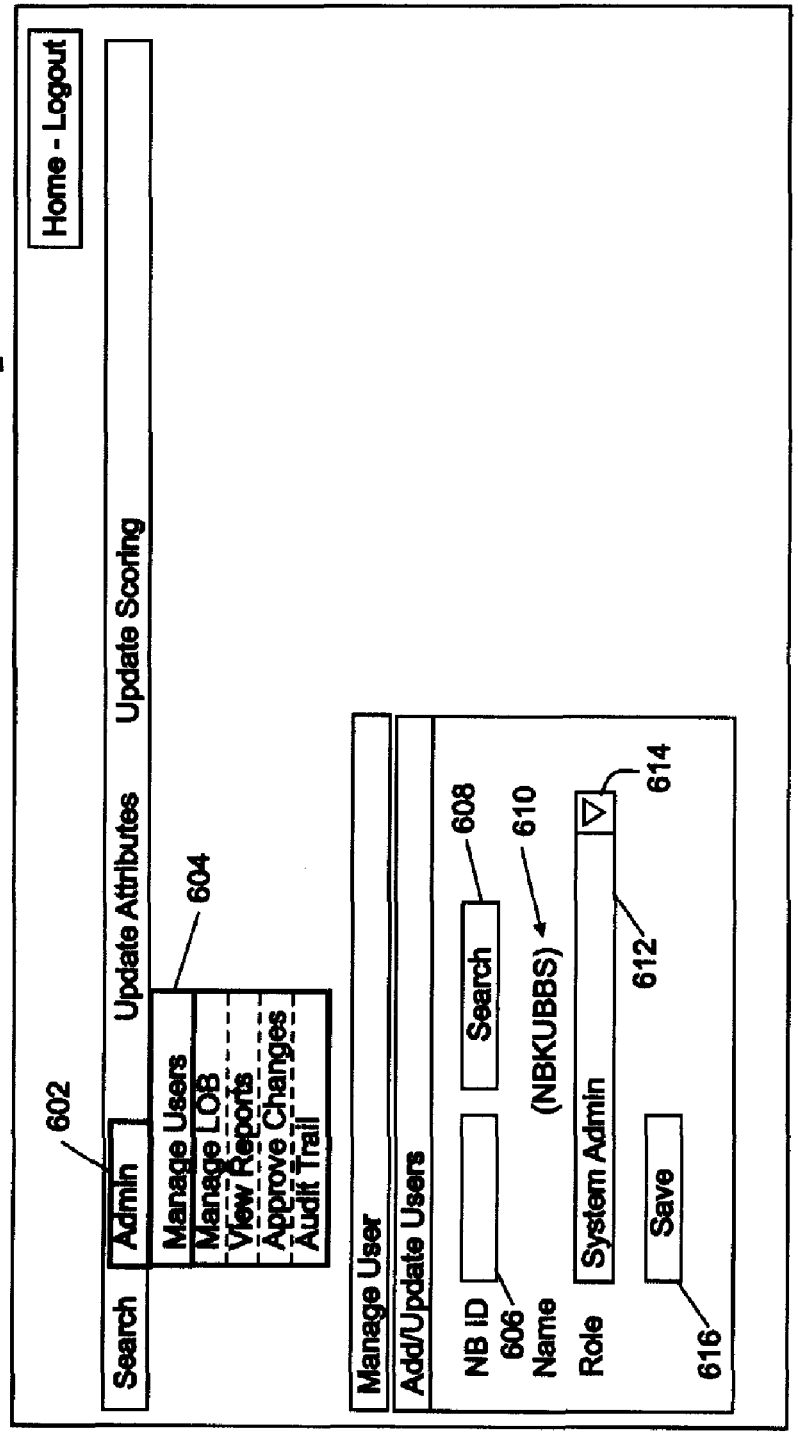
FIG. 6 is an example of a GUI, screenshot, web page or the like that may be presented by an AML Risk Rating Tool, computer program or method, such as the method of FIG. 1, to an authorized user or administrator illustrating a form to manage users in accordance with an embodiment of the present invention.

FIG. 6 is an example of a GUI 600, screenshot, web page or the like that may be presented by an AML Risk Rating Tool, computer program or method, such as the method 100 of FIG. 1, to an authorized user or administrator illustrating a form to manage users in accordance with an embodiment of the present invention. The Admin functions 602 may require a log-on to restrict access to a limited number of users or associates who will be responsible for maintaining the AML Risk Rating Tool. The GUI 600 may be accessed or linked by operating or clicking on an admin option 214a using a computer pointing device or the like. The admin option 214a may be labeled "Manage Users" under Admin tab 206 in GUI 200 (FIG. 2). The "Manage Users" option 214a in FIG. 2 may correspond to the "Manage Users" option 604 in GUI 600. The GUI 600 may permit a manager or administrator to add, delete or update a user or user's role. In box or line 606 a user's identity (NB IB) may be entered. A radio button 608 that may be labeled "Search" may then be activated or clicked using a computer pointing device or the like. A user's name 610, identity, role and other information may be displayed in response to operating the search radio button 608. In box or line 612, the role of the user 610 may be displayed. The role may be changed by entering a different role or selecting a new role from a selection drop down list associated with box 612. The drop down list may be displayed by operating or clicking on an arrow 614 associated with the box 612. The changes may then be saved by operating or clicking on a "Save" radio button 616. The additions or updates may be implemented with the next login or sign-on to the tool by the user 610.

Figure 7:
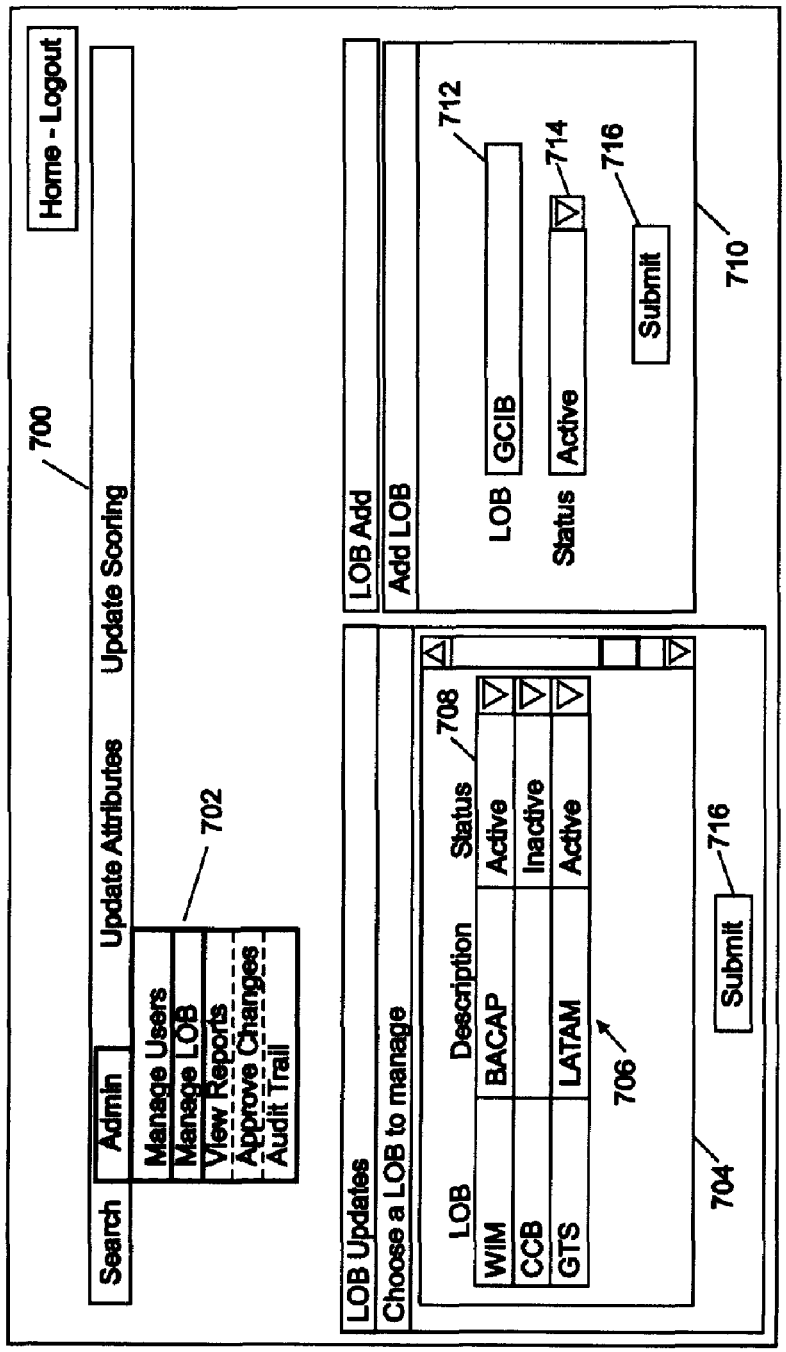
FIG. 7 is an example of a GUI, screenshot, web page or the like that may be presented by an AML Risk Rating Tool, computer program or method, such as the method of FIG. 1, to an authorized user or administrator illustrating a form to manage lines of business (LOB) that may access or utilize the AML Tool in accordance with an embodiment of the present invention.

FIG. 7 is an example of a GUI 700, screenshot, web page or the like that may be presented by an AML Risk Rating Tool, system, computer program or method, such as the method 100 of FIG. 1, to an authorized user or administrator illustrating a form to manage lines of business (LOB) that may access or utilize the AML Tool in accordance with an embodiment of the present invention. The GUI 700 may be accessed or linked to by operating or clicking on an admin option 214b that may be labeled "Manage LOB" or a similar descriptive label under the Admin tab 206 in GUI 200 (FIG. 2). The "Manage LOB" option 214a in GUI 200 may correspond to a "Manage LOB" option 702 in GUI 700. Different LOBs may be displayed in a section 704 of GUI 700 that may be labeled "Choose a LOB to manage" or the like. Section 704 may include a table 706 containing a description and status of each LOB. The status of an LOB may be changed by selecting a different status in a drop down selection list 708 associated with each status box 708 for each LOB. A new LOB may be added in a section 710 that may be labeled "Add LOB." A new LOB may be entered in a box 712 and a status entered or selected in box 714 using a drop down list. The additions or updates may be entered by operating or clicking on a radio button 716 that may be labeled "Submit." The additions or updates may be implemented with the next login or sign-on to the tool by the affected user or associate.

Figure 8:
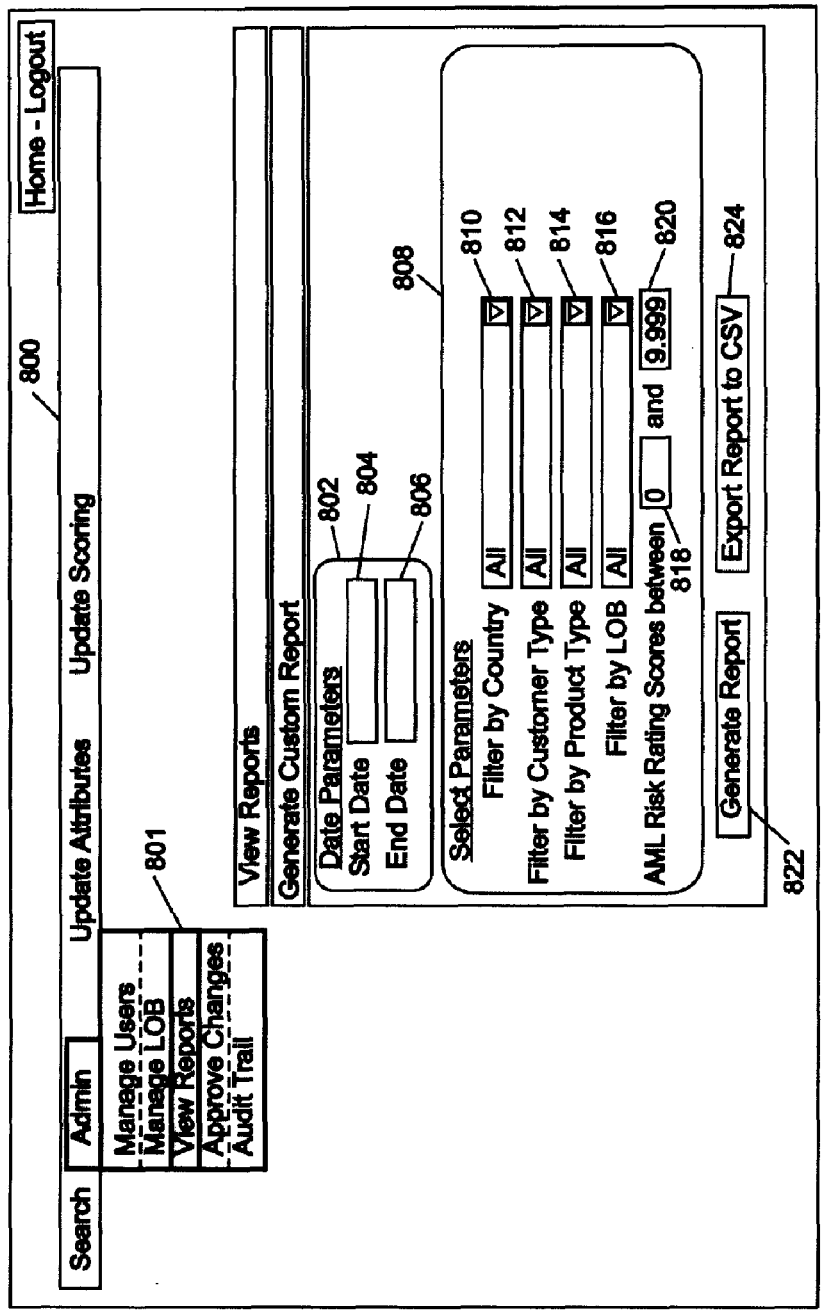
FIG. 8 is an example of a GUI, screenshot, web page or the like that may be presented by an AML Risk Rating Tool, computer program or method, such as the method of FIG. 1, to an authorized user or administrator illustrating a form to generate a custom report in accordance with an embodiment of the present invention.

FIG. 8 is an example of a GUI 800, screenshot, web page or the like that may be presented by an AML Risk Rating Tool, computer program or method, such as the method of FIG. 1, to an authorized user or administrator illustrating a form to generate a custom report in accordance with an embodiment of the present invention. The GUI 800 may be accessed or linked to by operating or clicking on an admin option 214c in GUI 200 (FIG. 2) labeled "View Reports" or the like under Admin tab 206. The "View Reports" option 214c in GUI 200 may correspond to a "View Reports" option 801 in GUI 800. The GUI 800 may include a section 802 that may be labeled "Date Parameters" or the like. In section 802, a user may enter a start date in box or line 804 and an end date in box or line 806. If no start or end date are specified, the AML Risk Rating Tool may assume all dates to generate a report. The GUI 800 may also include a section 808 that may be labeled "Select Parameters" or the like. In section 808, a country may be entered or selected from a drop down selection list in box or line 810 to filter the report results by the country selected. A customer type may be entered or selected from a drop down selection list in box or line 812 of section 808 to filter the report results by customer type. A product type may be entered or selected from a drop down selection list in box 814 to filter the report results by product type and an LOB may be entered or selected from a drop down selection list in box 816 to filter the report results by LOB. A default for each of the parameters in boxes 810-816 may be that the search results are filtered by all countries, customer types, product types and LOBs. A user may specify a range of AML risk rating scores in boxes 818 and 820 or enter a discrete score in each box. A report similar to report 402 in FIG. 4 may displayed or presented in response to a user operating or clicking on a radio button 822 that may be labeled "Generate Report" or the like. The report may also be saved by exporting to CSV in response to a user operating or clicking on a radio button 824 that may be labeled "Export Report to CSV" or a similar descriptive label.

Figure 9:
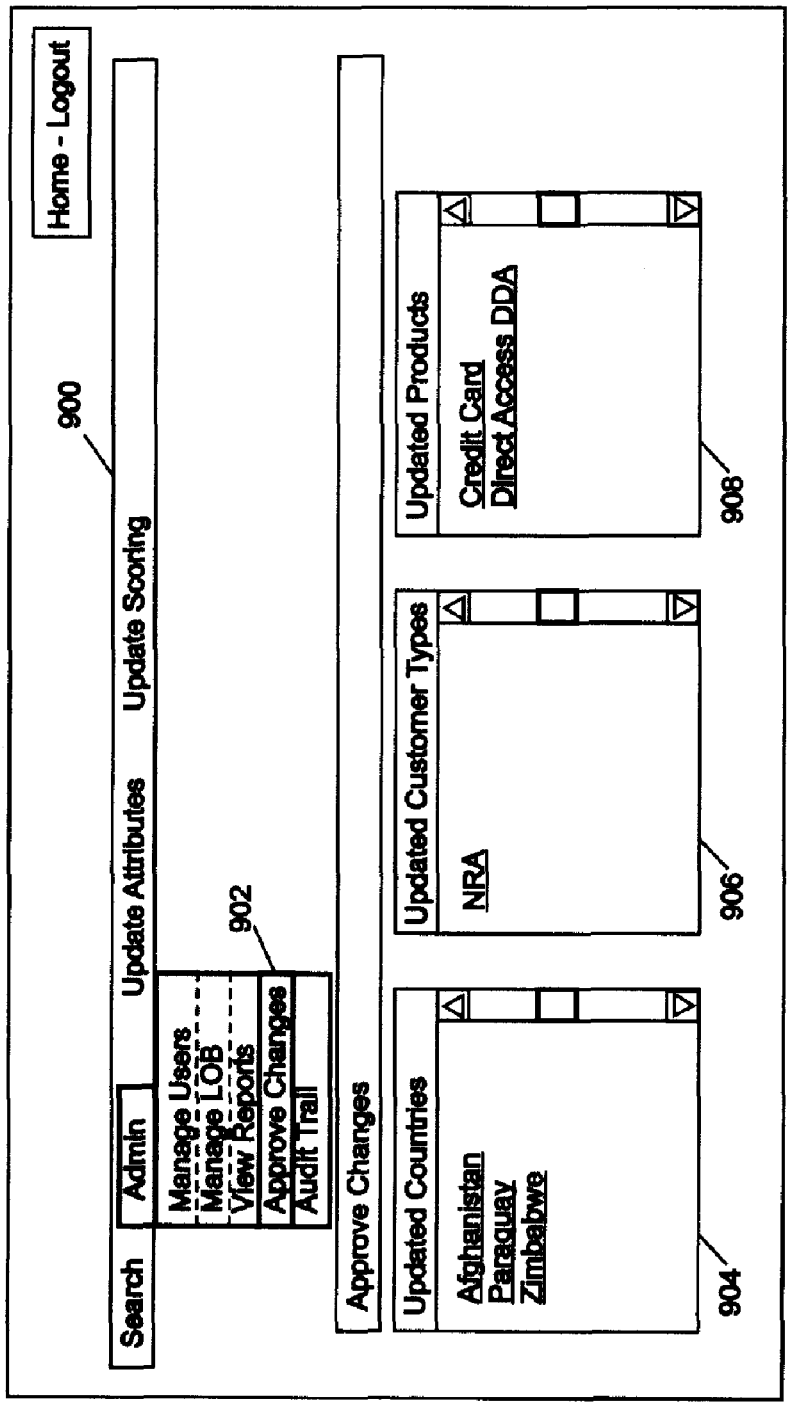
FIG. 9 is an example of a GUI, screenshot, web page or the like that may be presented by an AML Risk Rating Tool, computer program or method, such as the method of FIG. 1, to an authorized user or administrator illustrating a form to approve changes to countries, customer types and products in accordance with an embodiment of the present invention.
Figure 12A:
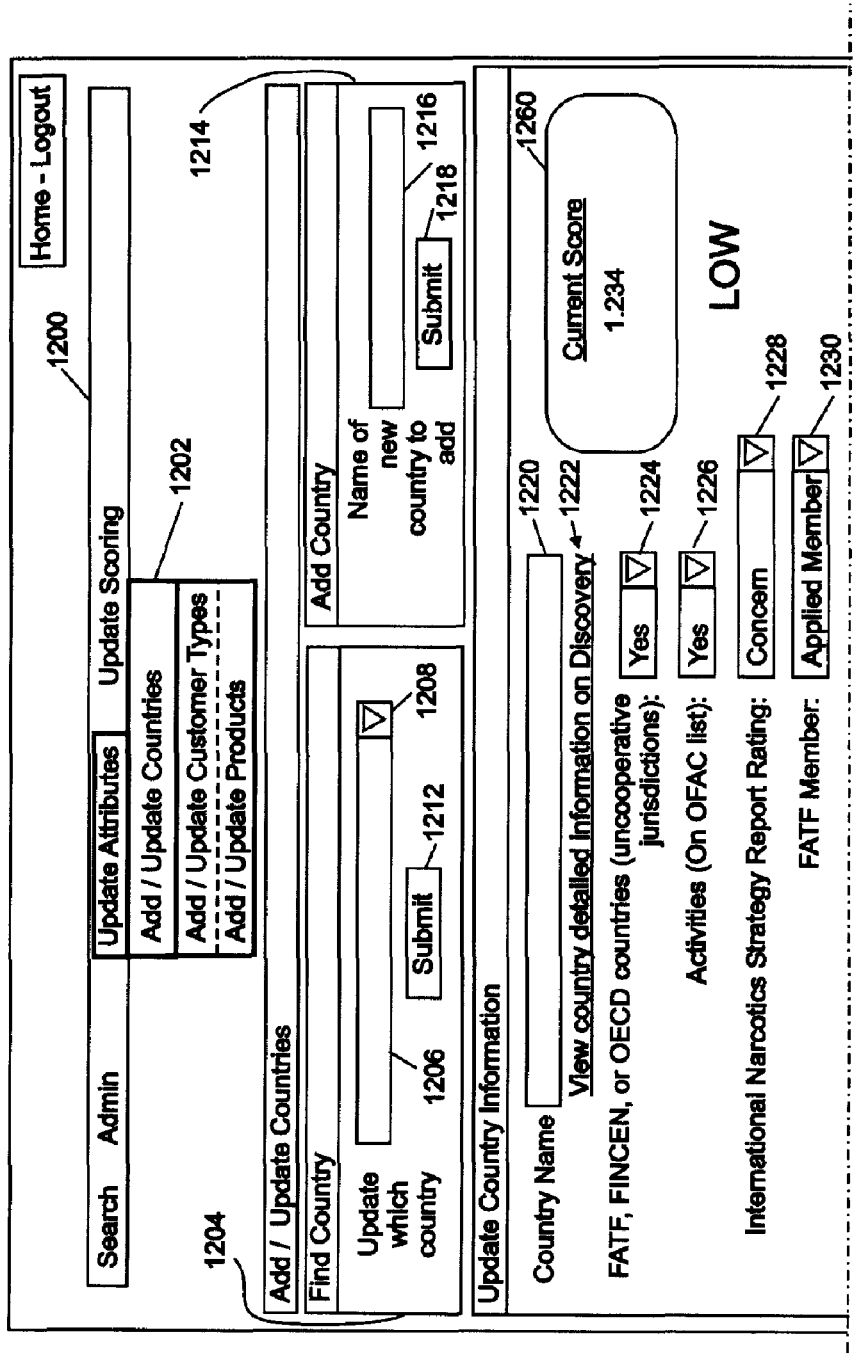

FIG. 9 is an example of a GUI 900, screenshot, web page or the like that may be presented by an AML Risk Rating Tool, computer program or method, such as the method 100 of FIG. 1, to an authorized user or administrator illustrating a form to approve changes to countries, customer types and products in accordance with an embodiment of the present invention. The GUI 900 may be accessed or linked by operating or clicking on an admin option 214d under the Admin tab 206 in GUI 200 (FIG. 2). The admin option 214d may be labeled "Approve Changes" or a similar descriptive label. The "Approve Changes" option 214d may correspond to an "Approve Changes" option 902 in GUI 900 (FIG. 9). The GUI 900 may include a section 904 that may be labeled "Updated Countries" or the like containing a list of countries that have been updated for approval. Each of the countries listed in section 904 may contain a link to an Update Countries Page or to a page containing the updates for the specific country. An example of an Update Countries Page or GUI is illustrated in FIG. 12 and will be described in more detail with reference to FIG. 12 below.

Figure 13A:
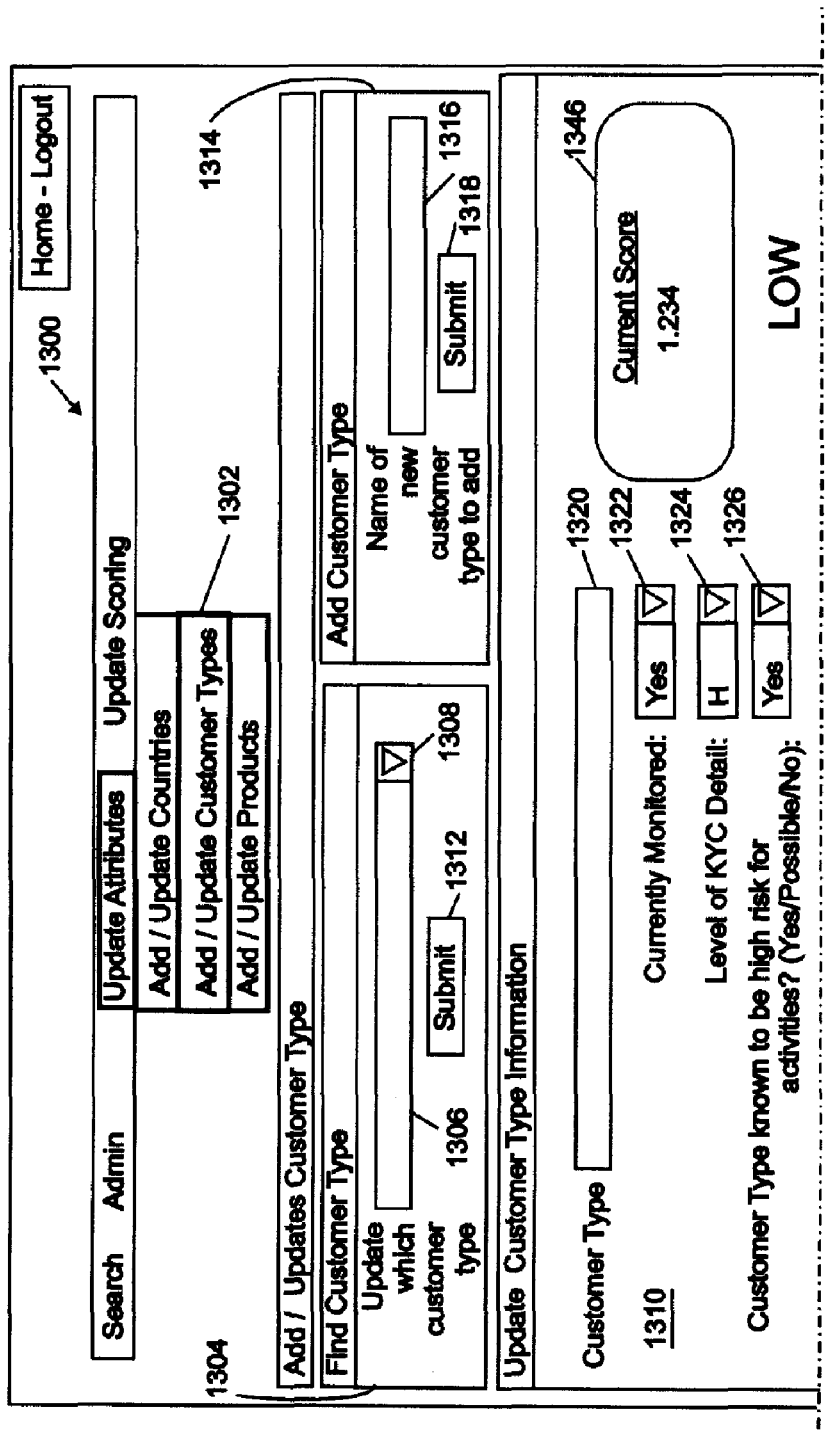

The GUI 900 may also include a section 906 that may be labeled "Updated Customer Types" or the like containing a list of updated customer types for approval. Each of the customer types listed for approval in section 906 may contain a link to an Update Customer Types Page or the like for the specific customer type. An example of an Update Customer Types Page is illustrated in FIG. 13 and will be described in more detail with reference to FIG. 13 below.

Figure 14A:
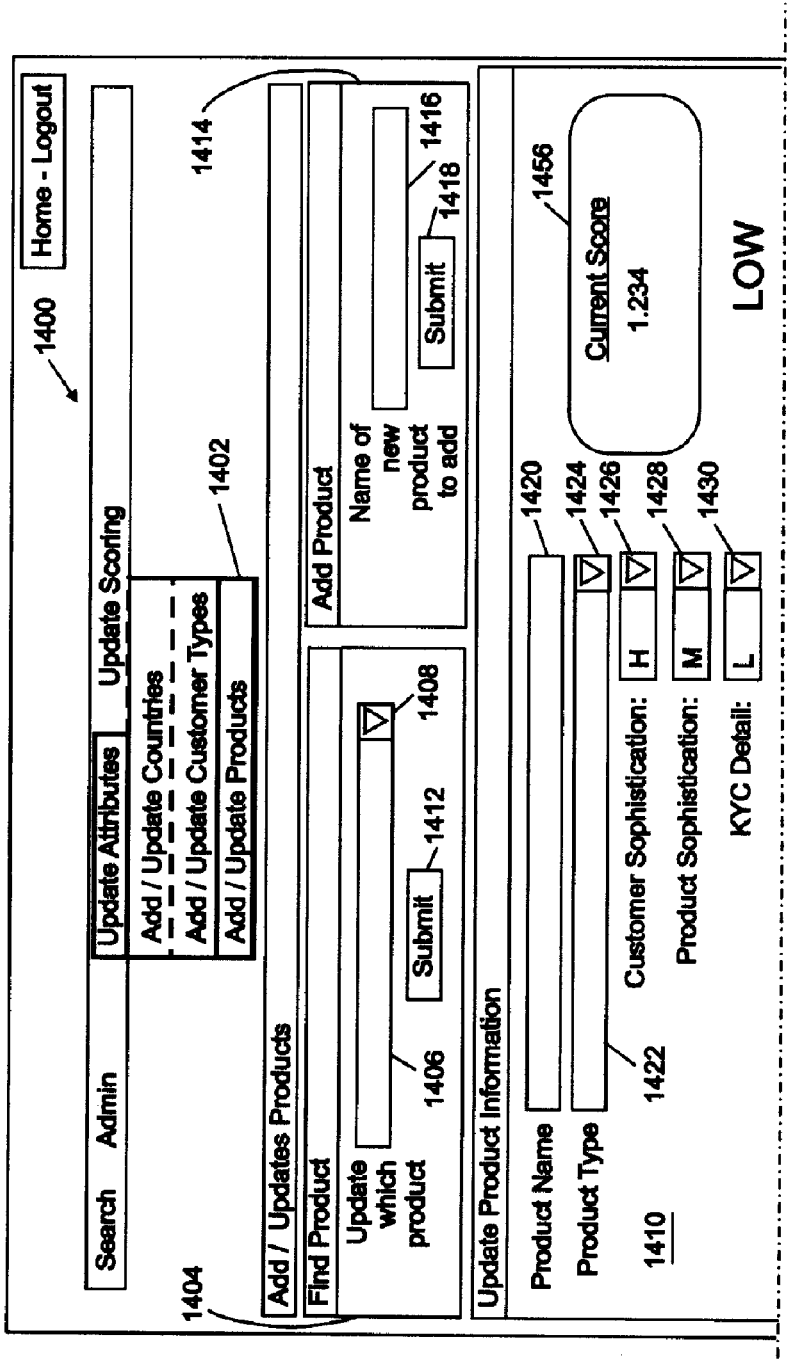

The GUI 900 may also include a section 908 that may be labeled "Updated Products" or a similar label and may contain a list of products with changes for approval. Each of the products listed for approval in section 908 may contain a link to an Update Product Page or the like. An example of an Update Product Page is illustrated in FIG. 14 and will be discussed in more detail with reference to FIG. 14 below.

Figure 10:
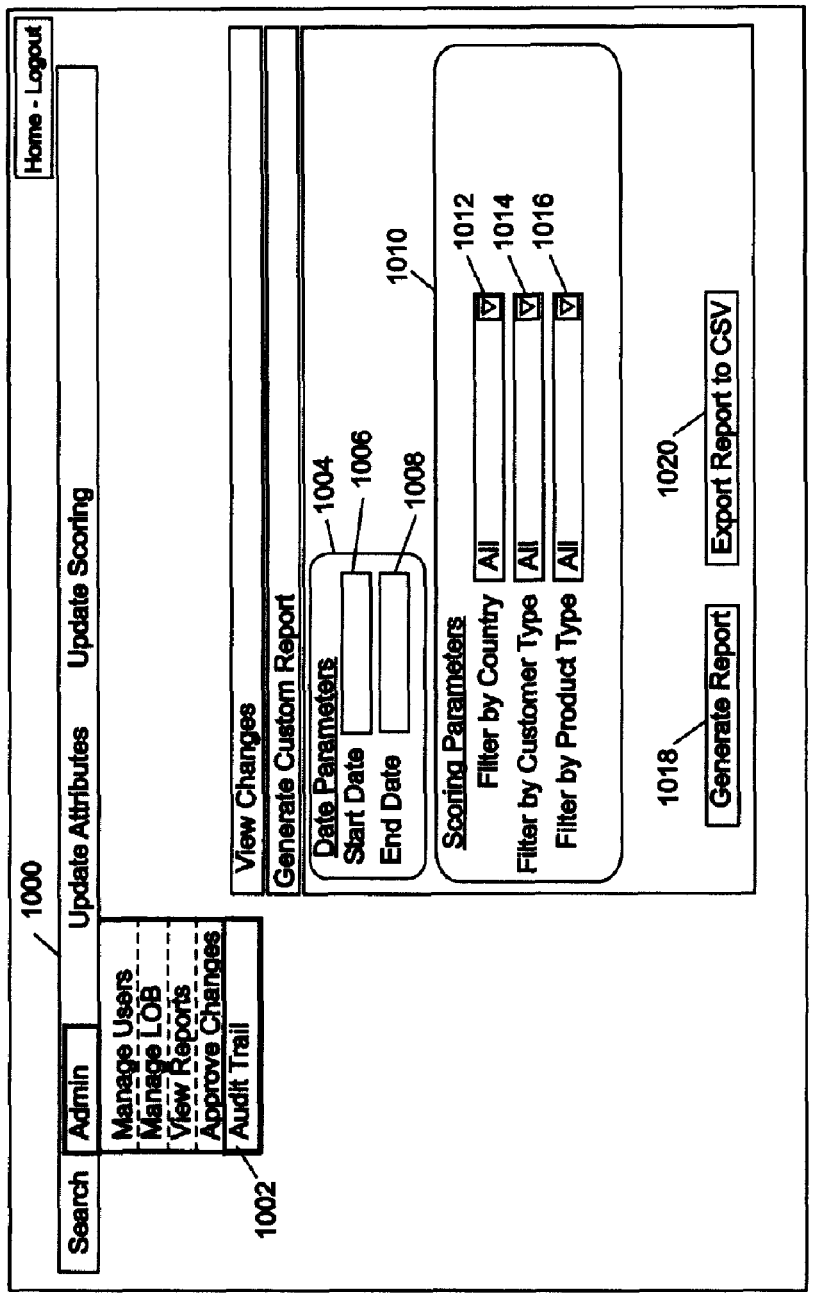
FIG. 10 is an example of a GUI, screenshot, web page or the like that may be presented by an AML Risk Rating Tool, computer program or method, such as the method of FIG. 1, to an authorized user or administrator illustrating a form to audit or track any additions, changes, updates or the like to the AML Risk Rating Tool in accordance with an embodiment of the present invention.

FIG. 10 is an example of a GUI 1000, screenshot, web page or the like that may be presented by an AML Risk Rating Tool, system, computer program or method, such as the method 100 of FIG. 1, to an authorized user or administrator illustrating a form to audit or track any additions, changes, updates or the like to the AML Risk Rating Tool in accordance with an embodiment of the present invention. The GUI 1000 may be accessed or linked by operating or clicking on an admin option 214e in GUI 200 (FIG. 2) that may be labeled "Audit Trail" or a similar descriptive label. The "Audit Trail" option 214d in FIG. 2 may correspond to an "Audit Trail" option 1002 in FIG. 10. The GUI 1000 may include a section 1004 for entering date parameters, such as a start date in box or line 1006 and an end date in box or line 1008. The GUI 1000 may also include a section 1010 for entering scoring parameters. In a box or line 1012, a country may be entered or selected from a drop down selection list to filter scoring parameters by the country selected. In box or line 1014, a customer type may be entered or selected from a drop down selection list to filter scoring parameters by the customer type selected, and in box or line 1016, a product type may be entered or selected from a drop down selection list to filter scoring parameters by the product type selected. The default for boxes 1012, 1014 and 1016 may be filtering by all countries, customer types and product types. By selecting any combination of parameters in sections 1004 and 1010, a user can generate a report to observe all changes and the party responsible for the changes. A report may be generated by operating or clicking on a radio button 1018 that may be labeled "Generate Report." FIG. 11 is an example of a GUI 1100, screenshot, web page or the like illustrating an AML Risk Rating Report 1102 depicting any changes, additions, updates or the like in response to operating the "Generate Radio" button 1018 in FIG. 10. The report may be saved in response to operating or clicking on a radio button 1020 that may be labeled "Export Report to CSV" or the like in GUI 1000.

FIG. 12 is an example of a GUI 1200, screenshot, web page or the like illustrating a form with drop down selection lists for adding, updating or editing answers or responses to questions or criteria related to a country as part of an AML Risk Rating Tool or computer program in accordance with an embodiment of the present invention. The GUI 1200 or screen shot may be presented or displayed by activating or clicking on an update attribute option 216a in GUI 200 (FIG. 2) that may be labeled "Add/Update Countries" or a similar descriptive label under the Update Attributes tab 208. The "Add/Update Countries" option 216a in FIG. 2 may correspond to the "Add/Update Countries" option 1202 in GUI 1200 (FIG. 12). The GUI 1200 may include a section 1204 that may be labeled "Find Country" or a similar description. The "Find Country" section 1204 may include a box or line 1206 to enter or select a country from a drop down selection list whose information or attributes may be updated or edited in GUI 1200. Box or line 1206 may have an associated identifying label such as "Update which country" or a similar description of the information to be entered or selected in the box 1206. The drop down selection list of countries currently loaded in the AML Risk Rating Tool may be displayed by operating or clicking on an arrow 1208 associated with the box 1206.

The form or GUI 1200 may include a section 1210 that may be labeled "Update Country Information" or a similar descriptive label. Section 1210 may contain the different questions or criteria and selected responses associated with the country selected in box 1206. Section 1210 may be populated with the currently selected responses associated with each question or criteria for the selected country in box 1206 in response to operating or clicking on a "Submit" radio button 1212 using a computer pointing device or the like. Each of the questions or criteria and possible answers or responses will be described in more detail below.

The GUI 1200 may also include another section 1214 that may be labeled "Add Country" or the like to add a new country to the AML Risk Rating Tool along with associated responses to the questions or criteria in section 1210. The section 1214 may contain a box or line 1216 for a user to enter the name or identity of the new country to be added. The box or line 1216 may be labeled "Name of new country to add" or a similar descriptive legend. A "Submit" radio button 1218 may be operated by clicking with a computer pointing device to submit the country identified in box 1216 to the AML Risk Rating Tool or system. After entering a new country in box 1216 or selecting a country in box 1206, a user may then select responses or edit responses to the questions or criteria in the "Update Country Information" section 1210.

In the "Update Country Information" section 1210, a box or line 1220 may display the name of the country for which the information or responses in section 1210 refer. Detailed information about the country in box 1220 may be accessed or linked in response to clicking on a radio button or a link 1222 that may be labeled "View country detailed information on Discovery." The detailed information may include documents or other information that may provide backup or background information that may have been used in responding to the questions or criteria in section 1210.

In the "Update Country Information" section 1210, different drop down selection lists may be displayed by operating an arrow associated with each selection box for adding or editing responses or answers to each question or criteria associated with and labeled by each box. The criteria or questions in section 1210 correspond to criteria or questions in GUI 1500 of FIGS. 15A and 15B that may be used to add or edit the answers or responses and corresponding values or scores for each answer or response that may be used in calculating the risk ratings or scores in GUI 300 (FIG. 3B). The GUI 1500 provides the different possible responses or answers that may be selected from the drop down list for each box corresponding to a question or criteria in section 1210 (FIG. 12).

Figure 15A:
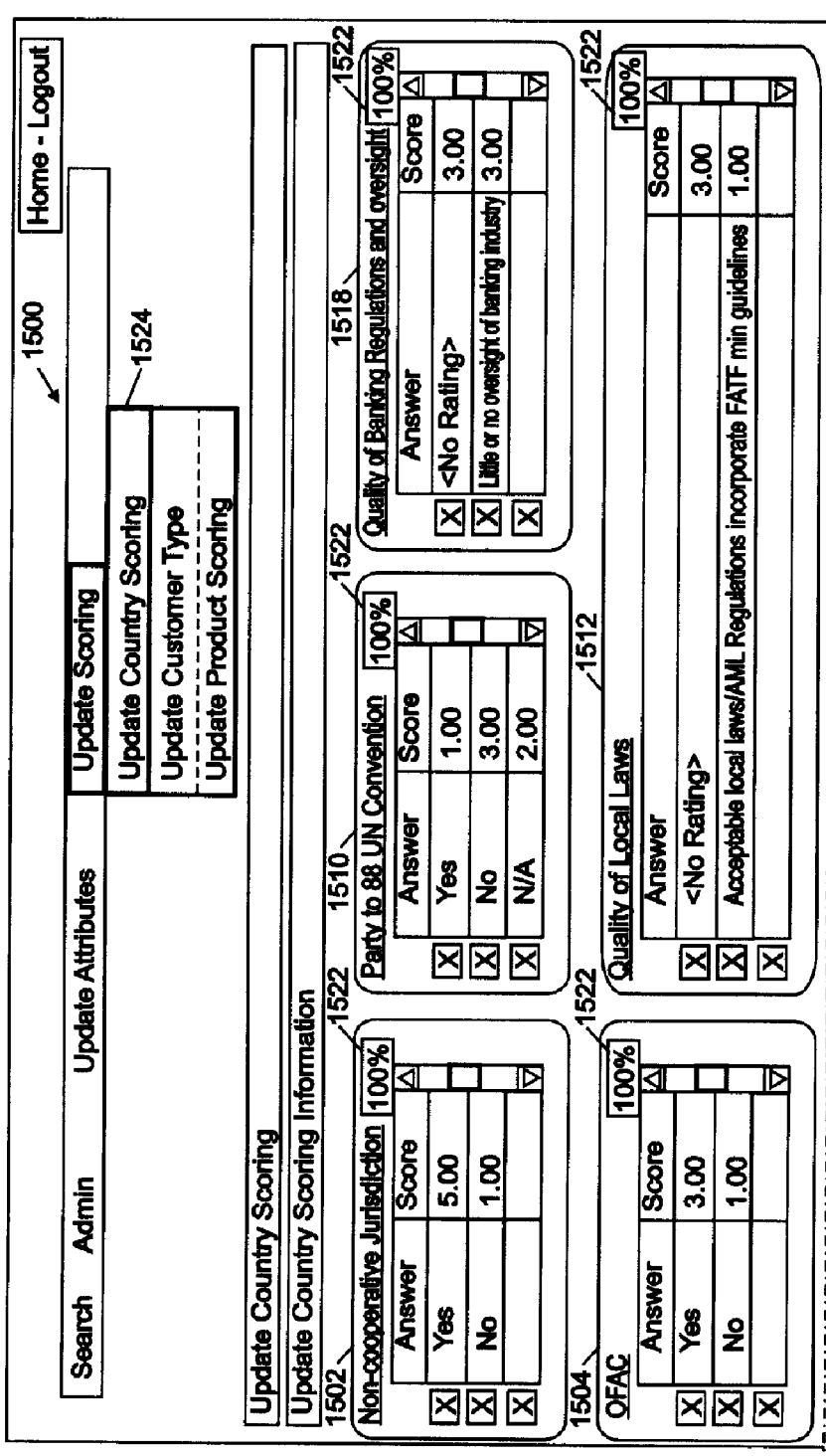

The question or criteria associated with a box 1224 may be whether the country designated in box 1220 is an uncooperative or non-cooperative jurisdiction. The box 1224 may be labeled "FATF, FINCEN, or OECD countries (uncooperative jurisdictions):" or a similar label or legend connoting the question or criteria associated with box 1224. The box 1224 may correspond to section 1502 in GUI 1500 (FIG. 15A). Examples of the different possible response or answers in box 1224 are "No" or "Yes" that may be entered or selected from a drop down list. The different possible responses or answers in box 1224 are indicated in section 1502. The "No" response may be assigned a risk rating value or score of 1.00 and the "Yes" response may be assigned a risk rating value or score of 5.00 for use in calculating a risk rating for the country of interest in box 1220 (FIG. 12). Accordingly, selecting a "Yes" response in box 1224 associated with a particular country will assign a score of 5.00 for this criteria for calculating the risk rating. This indicates that the country is at a high risk for money laundering activity or similar activity compared to a country that is a cooperative jurisdiction that would have a "No" response in box 1224 and assigned a score of 1.00 for this criteria for calculating the risk rating. Determining whether the jurisdiction is an uncooperative jurisdiction may be determined by reviewing lists or reports by the Financial Action Task Force on Money Laundering (FATF), Financial Crimes Enforcement Network (FinCEN), Organization for Economic Co-operation and Development (OECD) or the like, as may be indicated in the legend or label associated with box 1224 in FIG. 12.

The criteria or question associated with a box 1226 in section 1210 of GUI 1200 (FIG. 12) is whether the country indicated in box 1220 is associated with terrorist activity. Box 1226 may be labeled or have a legend "Terrorist Related Activities (On OFAC list)" or a similar legend connoting the question or criteria associated with box 1226. The possible answers or responses that may be entered or selected from a drop down list in box 1226 are "Yes" or "No." Box 1226 in GUI 1200 corresponds to section 1504 in GUI 1500 (FIG. 15A). Section 1504 includes the possible responses or answers to the criteria associated with box 1226 and the respective values or scores assigned to each possible response. A "No" response or answer in section 1504 has an assigned risk rating value or score of 1.00 for purposes of calculating a risk rating and a "Yes" response in section 1504 has an assigned risk rating value or score of 3.00 for purposes of calculating a risk rating. Whether a country is associated with terrorist activity may be determined by reviewing reports or lists provided by the Office of Foreign Asset Control (OFAC) or similar organizations as may be indicated in the legend or label for box 1226 (FIG. 12).

The criteria or question associated with a box 1228 in section 1210 of GUI 1200 (FIG. 12) is an International Narcotics Strategy Report Rating relative to the country designated in box 1220. Accordingly, the box 1228 may be labeled "International Narcotics Strategy Report Rating:" to indicate the criteria associated with box 1228. The International Narcotics Strategy Report Rating, box 1228, corresponds to section 1506 in GUI 1500 (FIG. 15B). Examples of the possible answers or responses that may be displayed and selected from a drop down selection list in box 1228 and the corresponding assigned risk rating value or score for calculating a risk rating are illustrated in section 1506. The possible answers or responses may include "No Rating" with a score of 3.00, "Concern" with a score of 2.00, "Monitored" with a score of 1.00, and "Primary Concern" with a score of 3.00. A higher value indicates a higher risk with respect to money laundering activity or the like.

The question or criteria associated with a box 1230 in section 1210 of GUI 1200 (FIG. 12) may be if the country in box 1220 is a FATF member. Accordingly, the box 1230 may be labeled "FATF Member:" to connote the criteria represented by box 1230. Box 1230 of GUI 1200 corresponds to section 1508 in GUI 1500 (FIG. 15B). The possible answers or responses that may be selected from a drop down list in box 1230 with respect to whether a country is a FATF member are indicated in section 1508. Examples of the possible answers or response in section 1508 and corresponding values or scores assigned to each answer for use in calculating a risk rating are "Applied for Membership" with a risk rating score of 2.00, "No" with a risk rating score of 3.00, and "Yes" with a risk rating score of 1.00.

The question or criteria associated with a box 1232 of GUI 1200 (FIG. 12) may be whether the country designated in box 1220 was a party to the 1988 United Nations Convention for drugs. The box 1232 may be labeled "Party to 1988 UN Convention" or the like. The box 1232 of GUI 1200 corresponds to section 1510 in GUI 1500 (FIG. 15A) which may be used to edit the different answers and corresponding scores for each criteria or question as previously discussed. The possible answers or responses that may be selected from a drop down list in box 1232 are indicated in section 1510. Examples of the possible answers or responses and corresponding values or scores assigned to each answer for use in calculating a risk rating may include, from section 1510, "N/A" with a score of 2.00, "No" with a risk rating score of 3.00 and "Yes" with a risk rating score of 1.00.

The question or criteria associated with a box 1234 of GUI 1200 (FIG. 12) may be a quality of the local laws and regulations within the country designated in box 1220. The box 1234 may be labeled "Quality of local laws and regulations:" or a similar legend to connote the question or criteria represented by box 1234. The box 1234 corresponds to section 1512 of GUI 1500 (FIG. 15A) which is used to edit different answers and corresponding values or scores for each criterion or question as previously discussed. The possible answers or responses that may be selected from a drop down list in box 1234 are indicated in section 1512. Examples of the possible answers or responses that may be selected and corresponding values or scores for use in calculating a risk rating may include, from section 1512, "No Rating" with a risk rating score of 3.00; "Acceptable local laws/AML Regulations—incorporate FATF minimum guidelines—require CTR/SAR reporting" with an assigned risk rating score of 1.00; "Local laws or regulations enacted, but do not include reporting of large/suspicious transactions" with an assigned risk rating score of 2.00; and "No local laws and regulations" with a score of 3.00.

The question or criteria associated with a box 1236 of GUI 1200 (FIG. 12) may be a government support indication with respect to the country identified in box 1220. The box 1236 may have a legend or label "Level of government support" or the like. The box 1236 corresponds to section 1514 in GUI 1500 (FIG. 15B). The possible answers or responses that may be selected from a drop down list in box 1236 are illustrated in section 1514. Examples of the possible answers or responses that may be selected and corresponding values or scores for use in calculating a risk rating may include, from section 1514, "No Rating" with a risk rating score of 3.00; "Sporadic law enforcement efforts and prosecutions, Inhibited by corruption" with a risk rating score of 3.00; "Vigorously enforced laws and regulations, Frequent prosecutions, Significant sanctions" with a risk rating score of 1.00; and "Vigorously enforced laws and regulations, Sanctions are weak" with a risk rating score of 2.00.

The question or criteria associated with a box 1238 of GUI 1200 (FIG. 12) may be strength of the banking industry within the country identified in box 1220. The box 1238 may be labeled "Strength of the banking industry" or a similar descriptive legend or label. The box 1238 may correspond to section 1516 in GUI 1500 (FIG. 15B) that may be used in adding or editing the responses or answers and associated values or scores as previously discussed. Examples of the possible answers or responses that may be entered or selected from a drop-down list in box 1238 are indicated in section 1516. Examples of the possible answers or responses that may be selected and corresponding values or scores for use in calculating a risk rating may include, from section 1516, "No Rating" with an assigned risk rating score of 3.00; "Growth is safe and sound—but not yet mature or strong" with a risk rating score of 2.00; "Mature and Strong" with a risk rating score of 1.0; and "Weak and Unstable" with an assigned risk rating score of 3.00.

The question or criteria associated with a box 1240 of GUI 1200 (FIG. 4) may be a quality of banking regulation and oversight within the country designated in box 1220. The box 1240 may be labeled "Quality of banking regulation/oversight" or the like. The box 1240 may correspond to section 1518 in GUI 1500 (FIG. 15A). Examples of possible answers or responses that may be entered or selected from a drop-down list in box 1240 are indicated in section 1518. Examples of the possible answers or responses and corresponding values for use in calculating a risk rating may include, from section 1518, "No Rating" with a risk rating score of 3.00; "Little or no oversight of the banking industry" with a risk rating score of 3.00; "Ongoing regulatory oversight, Violations are subject to prosecution, Insignificant Sanctions" with an assigned risk rating score of 2.00; and "Regulatory oversight is strong, and identified violations are sanctioned" with an assigned risk rating score of 1.00.

The question or criteria associated with a box 1242 of GUI 1200 (FIG. 12) may be a risk rating of a financial institution or entity providing the AML Risk Rating tool or computer program. The box 1242 may be labeled "Financial Institution Risk Rating" or a similar descriptive legend or label. The box 1242 may correspond to section 1520 in GUI 1500 (FIG. 15B). Examples of possible answers or responses that may be entered or selected from a drop-down list in box 1542 are indicated in section 1520. The risk rating responses may be a range of numbers with the lower numbers representing less risk. The risk rating may be an objective rating based on reviewing articles and other documents related to the country. The possible answers and responses that may be selected and corresponding values for use in calculating a risk rating may include, from section 1520, "No Rating" with a risk rating score of 3.00; a risk rating of "1-6" with a value of 1.00; a risk rating of "7-8" with a value of 2.00, and a risk rating of "9-11" with a risk rating of 3.00 for purposes of calculating a risk rating.

A box or space 1244 may also be provided in section 1210 of the form or GUI 1200 (FIG. 12) for an administrator or evaluator completing the form to enter any comments related to the country indicated in box 1220 or any comments related to the other selected entries in boxes 1224-1242.

A "Delete" radio button 1246 may be provided in GUI 1200 to delete the country indicated in box 1220 and all associated information in boxed 1224-1244. A "Save Changes" radio button 1248 may also be provided in the form or GUI 1200 to save the changes or new information associated with the country designated in box 1220. When saving a record, the AML Risk Rating Tool or system may provide a confirmation before finalizing the changes or additions. For example, a pop-up box may request "Are you sure you want to save?" or a similar request.

The changes or additions may not be implemented in the AML Risk Rating Tool or system until they have been approved or confirmed. An "Approve Changes" radio button 1250 may appear in the GU 1200 based on a current users entitlements or authorization. Any changes or additions in GU 1200 may not be considered valid and therefore useable in the AML Risk Rating Tool or system until approved by an authorized user.

A box 1252 may also be provided in the GUI 1200 to identify the individual or associate that last updated the form or GU 1200 or made the recommendations indicated by the completed GU 1200. A box 1254 may indicate a date when the GUI 1200 was last updated by the user or associate identified in box 1252. The boxes 1252 and 1254 may be pre-filled once the user or evaluator selects or operates the "Save Changes" button 1248.

Another box 1256 may be provided to identify an individual or associate that last approved the recommendations in the currently form or GU 1200. A box 1258 may indicate a date when the current form or GUI 1200 was last approved by the user or associate identified in box 1256. The boxes 1256 and 1258 may be pre-filled once the user or approver selects or operates the "Approve Changes" button 1250.

Referring to FIGS. 15A and 15B, each of the questions or criteria may have an associated weighting factor that may be designated in a box 1522 associated with each section 1502-1520 for each question or criteria. The weighting factor designated in each box 1522 may be applied to or multiplied by the score corresponding to each response to the questions or criteria associated with boxes 1224-1242 of GUI 1200 (FIG. 12) when calculating or determining a risk rating for the country designated in box 1220.

As previously discussed, the GUI 1500 may be used to update or edit country scoring information including responses or answers to the questions or criteria associated with boxes 1224-1242 in GUI 1200 (FIG. 12) and the values or scores associated with each question or criteria in sections 1502-1520 of GUI 1500. The GUI 1500 or screen shot may be presented or displayed in response to activating or clicking on an update scoring option 218a in GUI 200 (FIG. 2) that may be labeled "Update Country Scoring" or a similar descriptive label under the "Update Scoring" tab 210. The "Update Product Scoring" option 218a in FIG. 2 may correspond to an "Update Product Scoring" option 1524 in GUI 1500 (FIG. 15A). After updating or editing any answers or scores in blocks 1502-1520 or weighting factors in boxes 1510, a save changes radio button 1526 or the like may be operated or clicked on with a computer pointing device or the like to save the changes automatically to the AML Risk Rating Tool or system.

Referring back to FIG. 12, a current risk rating score indication 1260 may be determined or calculated and displayed in the GUI 1200 (FIG. 12) for the country designated in box 1220 based on responses or selections for each of the criteria or questions associated with boxes 1224-1242 and the weighting factor for each criteria or question as indicated in boxes 1522 (FIG. 15). The indication 1260 may be labeled "Current Score" or the like. As discussed above, each of the responses or answers to the different criteria or questions has a value or score assigned. The different scores or rating numbers corresponding to each of the responses selected in boxes 1224-1242 weighted or multiplied by any weighting factor may be averaged to provide the "Current Score" 1260 for the country indicated in box 1220. The "Current Score" 1260 may also correspond to the country risk rating 312 in GUI 300 (FIG. 3B).

FIG. 13 is an example of a GUI 1300, screenshot, web page or the like illustrating a form with drop down selection lists for adding, updating or editing answers or responses to questions or criteria related to customer types as part of an AML Risk Rating Tool, system or computer program in accordance with an embodiment of the present invention. The GUI 1300 or screen shot may be presented or displayed by activating or clicking on an update attribute option 216b in GUI 200 (FIG. 2) that may be labeled "Add/Update Customer Types" or a similar descriptive label under "Update Attributes" tab 208. The "Add/Update Customer Types" option 216b in FIG. 2 may correspond to an "Add/Update Customer Types" option 1302 in GUI 1300 (FIG. 13). The GUI 1300 may include a section 1304 that may be labeled "Find Customer Type" or a similar description. The "Find Customer Type" section 1304 may include a box or line 1306 to enter or select a customer type from a drop down selection list for which associated information or attributes may be updated or edited in GUI 1300. Box or line 1306 may have an associated identifying label such as "Update which customer type" or a similar description for what is to be entered or selected in the box 1306. The drop down selection list of customer types currently loaded in the AML Risk Rating Tool or system may be displayed by operating or clicking on an arrow 1308 associated with the box 1306.

The form or GUI 1300 may include a section 1310 that may be labeled "Update Customer Type Information" or a similar descriptive label. Section 1310 may contain the different questions or criteria and selected responses associated with the customer type selected in box 1306. Section 1310 may be populated with the selected responses associated with each question or criteria for the selected customer type in box 1306 in response to operating or clicking on a "Submit" radio button 1312 using a computer pointing device or the like. Each of the questions or criteria and possible answers or responses will be described in more detail below.

The GUI 1300 may also include another section 1314 that may be labeled "Add Customer Type" or the like to add a new customer type to the AML Risk Rating Tool or system along with associated responses to the questions or criteria in section 1310. The section 1314 may contain a box or line 1316 for a user to enter the name or identity of the new customer type to be added. The box or line 1316 may be labeled "Name of new customer type to add" or a similar descriptive legend. A "Submit" radio button 1318 may be operated by clicking with a computer pointing device to submit the new customer type identified in box 1316 to the AML Risk Rating Tool or system. After entering a new customer type in box 1316 or selecting a customer type in box 1306, a user may then select or edit responses to the questions or criteria in the "Update Customer Type Information" section 1310.

In the "Update Customer Type Information" section 1310, a box or line 1320 may display the identity of the customer type for which the information or responses in section 1310 refer. Different drop down selection lists may be displayed by operating an arrow associated with each selection box in section 1310 for adding or editing responses or answers to each question or criteria associated with and labeled by each box. The criteria or questions in section 1310 correspond to criteria or questions in GUI 1600 of FIG. 16. GUI 1600 may be used to add or edit the answers or responses and corresponding values or scores associated with each question or criteria. The GUI 1600 provides the different possible responses or answers that may be selected from the drop down list for each box corresponding to a question or criteria in section 1310.

The question or criteria associated with a box 1322 may be whether the customer type is one that is currently being monitored. The box 1322 may be labeled "Currently Monitored:" or have a similar descriptive legend. The box 1322 may correspond to a section 1602 in GUI 1600 (FIG. 8). Examples of the possible answers or responses that may be entered or selected from a drop down list in box 1322 are indicated in section 1602. The possible answers or responses that may be selected and examples of corresponding values or scores for use in calculating a risk rating may include, from section 1602, "No" with a risk rating score of 3.00 and "Yes" with a risk rating score of 1.00.

Figure 16:
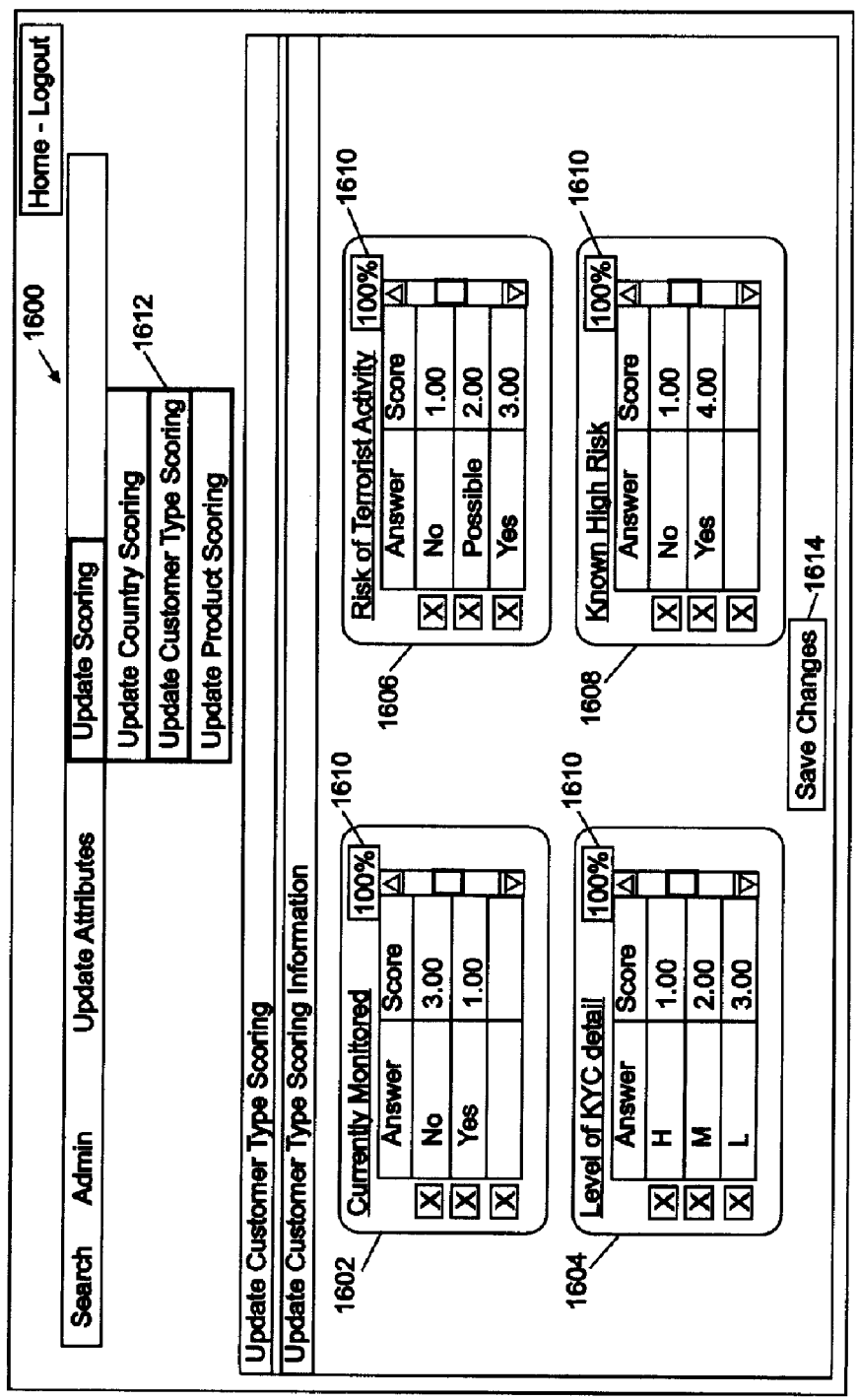
FIG. 16 is an example of a GUI, screenshot, web page or the like for updating or editing responses or answers to questions or criteria associated with a customer type, a weighting factor for each question or criteria, and scores or values for each response or answer associated with an AML Risk Rating Tool or program in accordance with an embodiment of the present invention.

The criteria or question associated with a box 1324 is section 1310 of GUI 1300 (FIG. 13) may be a level of how well the customer is known by the entity performing the risk evaluation or using the AML Risk Rating Tool or system. The box 1324 may be labeled "Level of KYC Detail:" or a similar label or legend, where KYC stands for know your customer. The box 1324 may correspond to a section 1604 in GUI 1600 (FIG. 16). Examples of the possible answers or responses that may be entered or selected from a drop down list in box 1324 are indicated in section 1604. The possible answers or responses that may be selected and examples of corresponding values or scores for use in calculating a risk rating may include, from section 1604, a high level of KYC ("H") with an assigned risk rating score of 1.00; a low level of KYC ("L") with an assigned risk rating score of 3.00; and a medium level of KYC ("M") with an assigned risk rating score of 2.00.

The criteria or question associated with a box 1326 in GUI 1300 (FIG. 13) may be if the customer type is known to be a high risk for terrorist related activities. The box 1326 may be labeled "Customer Type known to be high risk for terrorist related activities? (Yes/Possible/No):" or similar descriptive label. The box 1326 may correspond to a section 1606 in GUI 1600 (FIG. 16). Examples of the possible answers or responses that may be entered or selected from a drop down list in box 1326 are indicated in section 1606. The possible answers or responses that may be selected and examples of corresponding values or scores for use in calculating a risk rating may include, from section 1606, "No" with a risk rating score of 1.00; "Possible" with an assigned risk rating score of 2.00; and "Yes" with an assigned risk rating score of 3.00.

The criteria or question associated with a box 1328 may be whether the customer type is known to be a high risk under the USA Patriot Act or other recognized source, such as the FATF, FNCEN, OECD or the like. The box 1328 may have a label or legend such as "Customer Type known to be high risk under the USA PATIOT ACT or other recognized sources, e.g. FATF, FinCEN, OECD? (Yes/No)." The box 1328 may correspond to a section 1608 in GUI 1600 (FIG. 16). Examples of the possible answers or responses that may be entered or selected from a drop down list in box 1328 are indicated in section 1608. The possible answers or responses that may be selected and examples of corresponding values or scores for use in calculating a risk rating may include, from section 1608, "No" with a risk rating score of 1.00 and "Yes" with a risk rating score of 4.00.

A box or space 1330 may also be provided in section 1310 of the form or GUI 1300 (FIG. 13) for an administrator or evaluator competing the form to enter any comments related to the customer type indicated in box 1320 or any comments related to the other selected entries in boxes 1322-1328.

A "Delete" radio button 1332 may be provided in GUI 1300 to delete the customer type indicated in box 1306 or 1320 and all associated information in boxed 1322-1328. A "Save Changes" radio button 1334 may also be provided in the form or GUI 1300 to save the changes or new information associated with the customer type designated in box 1306 or 1320. When saving a record, the AML Risk Rating Tool or system may provide a confirmation before finalizing the changes or additions. For example, a pop-up box may request "Are you sure you want to save?" or a similar request.

The changes or additions in GU 1300 may not be implemented in the AML Risk Rating Tool or system until they have been approved or confirmed. An "Approve Changes" radio button 1336 may appear in the GUI 1300 based on a current users entitlements or authorization. Any changes or additions in GU 1300 may not be considered valid and therefore useable in the AML Risk Rating Tool or system until approved by an authorized user.

A box 1338 may also be provided in the GUI 1300 to identify the individual or associate that last updated the form or GU 1300 or made the recommendations indicated by the completed GU 1300. A box 1340 may indicate a date when the GU 1300 was last updated by the user or associate identified in box 1338. The boxes 1338 and 1340 may be pre-filled once the user or evaluator selects or operates the "Save Changes" button 1334.

Another box 1342 may be provided to identify an individual or associate that last approved the recommendations in the current form or GU 1300. A box 1344 may indicate a date when the current form or GUI 1300 was last approved by the user or associate identified in box 1342. The boxes 1342 and 1344 may be pre-filled once the user or approver selects or operates the "Approve Changes" button 1336.

Referring to FIG. 16, each of the questions or criteria may have an associated weighting factor that may be designated in a box 1610 associated with each section 1602-1608 for each question or criteria. The weighting factor designated in each box 1610 may be applied to or multiplied by the score corresponding to each response to the questions or criteria associated with boxes 1322-1328 in GUI 1300 when calculating or determining a risk rating for the customer type designated in box 1320 (FIG. 13).

As previously discussed, the GUI 1600 may be used to update or edit customer type scoring information including responses or answers to the questions or criteria associated with boxes 1322-1328 in GUI 1300 of FIG. 13 and the values or scores associated with each response. The GUI 1600 or screen shot may be presented or displayed in response to activating or clicking on an update scoring option 218b in GUI 200 (FIG. 2) that may be labeled "Update Customer Type Scoring" or a similar descriptive label. The "Update Customer Type Scoring" option 218b in FIG. 2 may correspond to an "Update Customer Type Scoring" option 1612 in GUI 1600 (FIG. 16). After updating or editing any answers or scores in blocks 1602-1608 or weightings in blocks 1610, a save changes radio button 1614 or the like may be operated or clicked on with a computer pointing device or the like to save the changes automatically to the AML Risk Rating Tool or system.

Referring back to FIG. 13, a current risk rating score indication 1346 may be determined or calculated and displayed in the GUI 1300 (FIG. 13) for the customer type selected in box 1306 or displayed in box 1320 based on responses or selections for each of the criteria or questions associated with boxes 1322-1328 and the weighting factor for each criteria or question as indicated in boxes 1610 (FIG. 16). The indication 1346 may be labeled "Current Score" or the like. As discussed above, each of the responses or answers to the different criteria or questions has a value or score assigned in GUI 1600. The different scores or rating numbers corresponding to each of the responses selected in boxes 1322-1324 weighted by any weighting factor may be averaged to provide the "Current Score" 1346 for the customer type indicated in box 1306 or 1320.

FIG. 14 is an example of a GUI 1400, screenshot, web page or the like illustrating a form with drop down selection lists for adding, updating or editing answers or responses to questions or criteria related to products or product types as part of an AML Risk Rating Tool, system or computer program in accordance with an embodiment of the present invention. The GUI 1400 or screen shot may be presented or displayed in response to activating or clicking on an update attribute option 216c in GUI 200 (FIG. 2) that may be labeled "Add/Update Products" or a similar descriptive label under "Update Attributes" tab 208. The "Add/Update Products" option 216c in FIG. 2 may correspond to an "Add/Update Products" option 1402 in GUI 1400 (FIG. 14). The GUI 1400 may include a section 1404 that may be labeled "Find Product" or a similar description. The "Find Product" section 1404 may include a box or line 1406 to enter or select a product from a drop down selection list for which associated information or attributes may be updated or edited in GUI 1400. Box or line 1406 may have an associated identifying label such as "Update which product" or a similar description. The drop down selection list of products currently loaded in the AML Risk Rating Tool or system may be displayed by operating or clicking on an arrow 1408 associated with the box 1406.

The form or GUI 1400 may include a section 1410 that may be labeled "Update Product Information" or a similar descriptive label. Section 1410 may contain the different questions or criteria and selected responses associated with the customer type selected in box 1406. Section 1410 may be populated with the selected responses associated with each question or criteria for the selected customer type in box 1406 in response to operating or clicking on a "Submit" radio button 1412 using a computer pointing device or the like. Each of the questions or criteria and possible answers or responses will be described in more detail below.

The GUI 1400 may also include another section 1414 that may be labeled "Add Product" or the like to add a new product to the AML Risk Rating Tool or system along with associated responses to the questions or criteria in section 1410. The section 1414 may contain a box or line 1416 for a user to enter the name or identity of the new product to be added. The box or line 1416 may be labeled "Name of new product to add" or a similar descriptive legend. A "Submit" radio button 1418 may be operated by clicking with a computer pointing device to submit the new product identified in box 1416 to the AML Risk Rating Tool or system. After entering a new product in box 1416 or selecting a new product in box 1406, a user may then respond or select responses to the questions or criteria in the "Update Product Information" section 1410.

In the "Update Product Information" section 1410, a box or line 1420 may display the identity of the product for which the information or responses in section 1410 refer. A box 1422 may also be provided in section 1410 to enter or select a product type corresponding to the product in box 1420. The product type in box 1422 may be selected from a drop down list of product types provided for in the AML Risk Rating Tool or system in response to operating or clicking on an arrow 1424 associated with the box 1422.

Different drop down selection lists may be displayed by operating an arrow associated with each selection box in section 1410 for adding or editing responses or answers to each question or criteria associated with and labeled by each box. The criteria or questions in section 1410 correspond to criteria or questions in GUI 1700 of FIG. 17. GUI 1700 may be used to add or edit the answers or responses and corresponding values or scores for each answer or response. The GUI 1700 provides the different possible responses or answers that may be selected from the drop down list for each box corresponding to a question or criteria in section 1410.

Figure 17A:
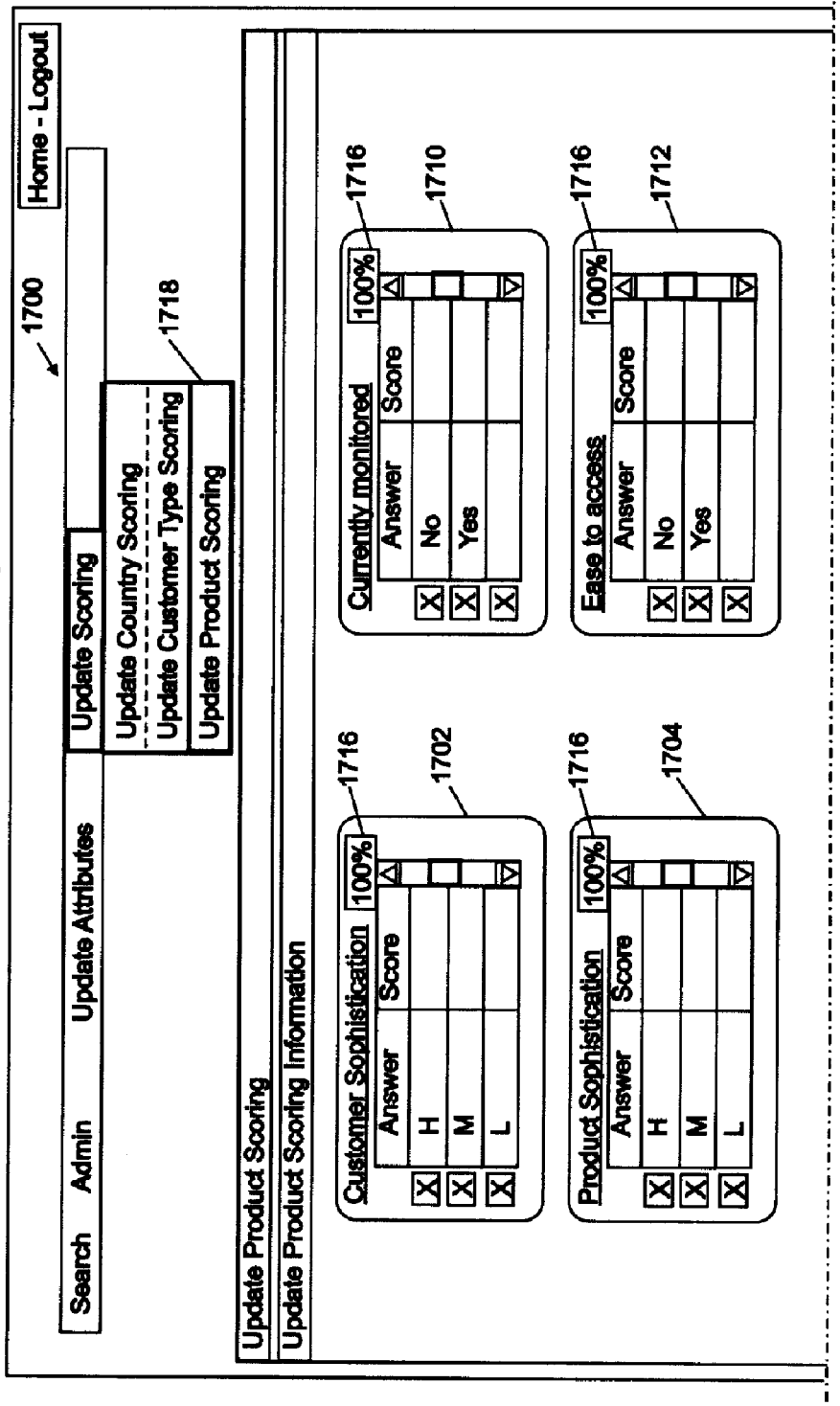

The criteria or question associated with box 1426 may be a level of customer sophistication with respect to the product and product type in boxes 1420 and 1422. The box 1426 may be labeled "Customer Sophistication:" or the like to indicate the criteria or question associated with box 1426. The box 1426 may correspond to section 1702 in GUI 1700 (FIG. 17). Examples of the possible answers or responses that may be entered or selected from a drop down list in box 1426 are indicated in section 1702. The possible answers or responses that may be selected and corresponding values for use in calculating a risk rating may include, from section 1702, "H" for a high level of customer sophistication with respect to the product and product type in boxes 1420 and 1422 with a risk rating value or score of 1.00; "L" for a low level of customer sophistication with a risk rating score of 3.00; and "M" for a medium level of customer sophistication with respect to the product and product type in boxes 1420 and 1422 with a risk rating score of 2.00.

The criteria or question associated with box 1428 may be a level of product sophistication or complexity of the product or product type in boxes 1420 and 1422. For example, a saving account would represent a relatively low product sophistication while a derivative interest rate swap would represent a relatively high level of product sophistication or complexity. The box 1428 may be labeled "Product Sophistication:" or a similar label or legend to indicate the question or criteria associated with box 1428 The box 1428 may correspond to section 1704 in GUI 1700 (FIG. 17). Examples of the possible answers or responses that may be entered or selected from a drop down list in box 1428 are indicated in section 1704. The possible answers or responses that may be selected and corresponding values or scores for use in calculating a risk rating may include, from section 1704, "H" for a relatively high level of product sophistication or complexity with a risk rating value or score of 1.00; "L" for a relatively low level of product sophistication with a risk rating score of 3.00; and "M" for a medium level of customer sophistication with respect to the product or product type with a risk rating score of 2.00.

The criteria or question associated with box 1430 may be a level of knowledge about the customer or know your customer (KYC) detail with respect to the product or product type in boxes 1420 and 1422. The box 1430 may be labeled "KYC Detail:" or a similar label or legend to indicate the question or criteria associated with box 1430 The box 1430 may correspond to section 1706 in GUI 1700 (FIG. 17). Examples of the possible answers or responses that may be entered or selected from a drop down list in box 1430 are indicated in section 1706. The possible answers or responses that may be selected and corresponding values for use in calculating a risk rating may include, from section 1706, "H"

for a relatively high level of institutional knowledge about the customer with respect to the product or product type with a risk rating value or score of 1.00; "L" for a relatively low level of knowledge about the customer with a risk rating score of 4.00; and "M" for a medium level of knowledge about the customer with respect to the product or product type with a risk rating score of 2.00.

The criteria or question associated with box 1432 may be a propensity for the product or product type in boxes 1420 and 1422 to be used for money laundering or similar activity. The box 1432 may be labeled "Propensity for money laundering:" or a similar label or legend to indicate the question or criteria associated with box 1432. The box 1432 may correspond to section 1708 in GUI 1700 (FIG. 17). Examples of the possible answers or responses that may be entered or selected from a drop down list in box 1432 are indicated in section 1708. The possible answers or responses that may be selected and corresponding values for use in calculating a risk rating may include, from section 1708, "H" for a relatively high propensity of use of the product or product type for money laundering or similar activity with a risk rating value or score of 4.00; "M" for a medium propensity of use of the product or product type for use in money laundering or similar activity with a risk rating score of 3.00; and "L" for a relatively low level of propensity for use in money laundering or similar activity with a risk rating score of 1.00.

The criteria or question associated with box 1434 may be whether the product or product type in boxes 1420 and 1422 are currently being monitored for money laundering or related activity. The box 1434 may be labeled "Product Currently Monitored:" or a similar label or legend to indicate the question or criteria associated with box 1434. The box 1434 may correspond to section 1710 in GUI 1700 (FIG. 17). Examples of the possible answers or responses that may be entered or selected from a drop down list in box 1434 are indicated in section 1710. The possible answers or responses that may be selected are either a "Yes" or "No." The corresponding values or scores for use in calculating a risk rating are 3.00 for a "No" response and 1.00 for a "Yes" response.

The criteria or question associated with box 1436 may be whether or not the product or product type indicated in boxes 1420 and 1422 can be easily accessed. The box 1436 may be labeled "Easy to Access:" or a similar legend or label to indicate the question or criteria associated with box 1436 The box 1436 may correspond to section 1712 in GUI 1700 (FIG. 17). Examples of the possible answers or responses that may be entered or selected from a drop down list in box 1436 are indicated in section 1712. The possible answers or responses that may be selected may be either a "Yes" or "No." The corresponding values or scores for use in calculating a risk rating are 3.00 for a "Yes" response and 1.00 for a "No" response to the question or criteria for box 1436.

The criteria or question associated with box 1438 may be a level or degree of attractiveness of the product or product type indicted in boxes 1420 and 1422, respectively, for use by terrorists. The box 1438 may be labeled "Historically attractive to terrorist:" or a similar label or legend indicative of the question or criteria associated with box 1438. The box 1438 may correspond to section 1714 in GUI 1700 (FIG. 17). Examples of the possible answers or responses that may be entered or selected from a drop down list in box 1438 are indicated in section 1714. The possible answers or responses that may be selected and corresponding values or scores for use in calculating a risk rating may include, from section 1714, "H" for a relatively high level of attractiveness of the product or product type to terrorists with a risk rating value or score of 4.00; "M" for a medium level of attractiveness to terrorists with a risk rating score of 3.00; and "L" for a relatively low level of attractiveness of the product or product type to terrorists with a risk rating score of 1.00.

A box or space 1440 may also be provided in section 1410 of the form or GUI 1400 (FIG. 14) for an administrator or evaluator completing the form to enter any comments related to the product or product type indicated in boxes 1420 and 1422, respectively, or any comments related to the other selected entries in boxes 1426-1438.

A "Delete" radio button 1442 may be provided in GUI 1400 to delete the product indicated in box 1420 and all associated information in boxes 1424-1440. A "Save Changes" radio button 1444 may also be provided in the form or GU 1400 to save the changes or new information associated with the product designated in box 1420. When saving a record, the AML Risk Rating Tool or system may provide a confirmation before finalizing the changes or additions. For example, a pop-up box may request "Are you sure you want to save?" or a similar request.

The changes or additions in GUI 1400 may not be implemented in the AML Risk Rating Tool or system until they have been approved or confirmed. An "Approve Changes" radio button 1446 may appear in the GUI 1400 based on a current users entitlements or authorization. Any changes or additions in GUI 1400 may not be considered valid and therefore useable in the AML Risk Rating Tool or system until approved by an authorized user.

A box 1448 may also be provided in the GUI 1400 to identify the individual or associate that last updated the form or GUI 1400 or made the recommendations indicated by the completed GUI 1400. A box 1450 may indicate a date when the GUI 1400 was last updated by the user or associate identified in box 1448. The boxes 1448 and 1450 may be pre-filled once the user or evaluator selects or operates the "Save Changes" button 1444.

Another box 1452 may be provided to identify an individual or associate that last approved the recommendations in the current form or GU 1400. A box 1454 may indicate a date when the current form or GUI 1400 was last approved by the user or associate identified in box 1452. The boxes 1452 and 1454 may be pre-filled once the user or approver selects or operates the "Approve Changes" button 1446.

Referring to FIG. 17, each of the questions or criteria may have an associated weighting factor that may be designated in a box 1716 associated with each block 1702-1714 for each question or criteria. The weighting factor designated in each box 1716 may be applied to the score or multiplied by the score corresponding to each selected response to the questions or criteria associated with boxes 1426-1438 when calculating or determining a risk rating for the product designated in block 1406 and 1420 (FIG. 14).

As previously discussed, the GUI 1700 may be used to update or edit product scoring information including responses or answers to the questions or criteria associated with box 1426-1438 in GUI 1400 of FIG. 14 and the values or scores associated with each question or criteria in section 1702-1714 of GUI 1700. The GUI 1700 or screen shot may be presented or displayed in response to activating or clicking on an update scoring option 218c in GUI 200 (FIG. 2) that may be labeled "Update Product Scoring" or a similar descriptive label under the "Update Scoring" tab 210. The "Update Product Scoring" option 218c in GUI 200 may correspond to an "Update Product Scoring" option 1718 in GUI 1700 (FIG. 17). After updating or editing any answers or scores in sections 1702-1714 or weight factors in boxes 1716, a save changes radio button 1720 or the like may be operated or clicked on with a computer pointing device or the like to save the changes automatically to the AML Risk Rating Tool or system.

Referring back to FIG. 14, a current risk rating score indication 1456 may be determined or calculated and displayed in the GUI 1400 for the product selected in box 1406 and displayed on box 1420 based on responses or selections for each of the criteria or questions associated with boxes 1426-1438 and the weighting factor for each criteria or question as indicated in boxes 1716 (FIG. 17). The indication 1456 may be labeled "Current Score" or the like. As discussed above, each of the responses or answers to the different criteria or questions has a value or score assigned. The different scores or rating numbers corresponding to each of the responses selected in boxes 1426-1428 weighted by any weighting factor in boxes 1716 (FIG. 17) may be averaged to provide the "Current Score" 1456 for the product indicated in box 1406 or 1420.

The GUIs 200-1700 may be formed using known software or computer languages, such as Java®, Java Script®, a mark up language, such as Hyper Text Markup Language, or other web or Internet based or adaptable language.

FIG. 18 is a block schematic diagram of an example of a system 1800 to evaluate anti-money laundering (AML) risk or the like in accordance with an embodiment of the present invention. The system 1800 may include a server 1802. A Risk Rating Tool 1804 or computer program may operate on the server 1802. The method 100 and software to generate the GUIs of FIGS. 2-17 may be embodied in the Risk Rating Tool 1804.

The Risk Rating Tool 1804 may be coupled to a database 1806 to access information and reports related to the AML risk rating process. As previously discussed, the database 1806 may store risk ratings, risk rating histories 354 (FIG. 3) and other data, or results related to each customer, person or other legal entity under evaluation, each country, product type, product and customer type. The stored risk ratings and other data may be used for further analysis, such as tracking trends and generating other reports or documentation for compliance with internal policies and governmental requirements. The database 1806 may also store reports and other documentation to back-up or justify the risk rating values assigned to each of the answers or responses in GUIs 1500, 1600 and 1700 of FIGS. 15-17, respectively.

I/O devices 1808 may be provided to interface with the server 1802. The I/O devices 1808 may be separate input and output devices or combination I/O devices that may be coupled to the server 1802. Examples of the I/O devices 1808 may include a keyboard, computer pointing devices, display or monitor, disk drives, optical, mechanical, or infrared I/O devices or the like. The I/O devices 1808 may be used to edit the country, product and customer information as discussed above and to control operation of the AML Risk Rating Tool 1804 or system.

A user, client or administrator 1810 may access the server 1802 and AML Risk Rating Tool 1804 via a browser 1812 over a network or medium 1814. The network or medium 1814 may be any sort of communication network, such as the Internet or private network. The browser 1812 may be any sort of Internet browser. The browser 1812 may operate on a processor 1816. Input and output (I/O) devices 1818 may be provided for the user or administrator to interface with the processor 1816 and access the AML Risk Rating Tool 1804. The I/O devices 1018 may be similar to the I/O devices 1808. The I/O devices 1818 may include a computer pointing device to operate or click on the radio buttons or to select options from drop down lists presented by the AML Risk Rating Tool as discussed above.

Elements of the present invention, such as method 100 of FIG. 1, GUIs or screen shots 200-1700 of FIGS. 2-17, and system 1800 of FIG. 18, may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in a medium for use by or in connection with a system, such as system 1800 of FIG. 18. Examples of such a medium may be illustrated in FIG. 18 as network or medium 1814 and I/O devices 1808 and 1818. A computer-usable or readable medium may be any medium that may contain, store, communicate or transport the program for use by or in connection with a system. The medium, for example, may be an electronic, magnetic, optical, electro-magnetic, infrared or semiconductor system or the like. The medium may also be simply a stream of information being retrieved when the computer program product is "downloaded" through a network, such as the Internet or the like. The computer-usable or readable medium could also be paper or another suitable medium upon which the program may be printed.

The risk ratings or scores from the AML Risk Rating Tool or system of the present invention may be used to drive certain other anti-money laundering and detection processes. For example, if the risk ratings are in a predetermined range, further action with respect to a particular customer may be taken. Examples of further actions may include a closer scrutiny or monitoring of the customer, refusing the customer access to certain financial products, services or systems, notification of certain government agencies of the customer's activities, or the like, as may be legally permitted or required. The risk ratings and other data stored by the AML Risk Rating Tool 1804 (FIG. 18) or program provides documentation that may provide merit or justification for the levels of scrutiny placed on various customers, individuals or other legal entities and other actions or sanctions taken. The risk ratings or scores and other data may also provide an audit trail and justification for actions by a financial institution when responding to inquiries from government agencies. The AML Risk Rating Tool of method 100 (FIG. 1), GUIs 200-1700 (FIGS. 2-17) and system 1800 (FIG. 18) also allow assignment of a specific risk score based in a customer's product mix and where a customer is doing business rather than just the customer type or who the customer is. The AML Risk Rating Tool, system or computer program of the present invention also reduces the need to perform transaction based monitoring which can be significantly burdensome. The AML Risk Rating Tool can focus on transaction based monitoring on selected customers that fall into or exceed a predetermined risk rating or score.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method to evaluate anti-money laundering risk, comprising:
    identifying a person or other legal entity to be evaluated;

selecting a country associated with the person or other legal entity;

selecting at least one financial product or investment associated with the person or other legal entity;

selecting a customer type associated with the person or other legal entity;

determining a risk rating for evaluating anti-money laundering risk, using a computer, based on responses to predetermined criteria or questions related to the country, the at least one financial product or investment and the customer type, wherein the determining the risk rating comprises:

evaluating a sophistication of the person or other legal entity with respect to the at least one selected financial product or investment; and determining the at least one selected financial product or investment's propensity for use for money laundering; and presenting the risk rating to a user.

2. The method of claim 1, wherein determining the risk comprises setting a value corresponding to each of the responses to the predetermined criteria or question.

3. The method of claim 2, wherein determining the risk comprises calculating one of an average or a weighted average of the values based on the selected country, the at least one selected financial product or investment and the selected customer type.

4. The method of claim 1, wherein determining the risk further comprises at least one of:

evaluating if the selected country is a cooperative jurisdiction;

determining if the selected country was a party to the 1988 United Nations Convention on drugs;

evaluating a quality of banking regulation and oversight in the selected country;

determining if the selected country is associated with terrorist related activity or on the Office of Foreign Asset Control (OFAC) list;

evaluating a quality of local laws of the selected country;

entering an International Narcotics Strategy Report Rating for the selected country;

evaluating a level of government support in the selected country for enforcement of laws and regulations and prosecution of offenses;

determining if the selected country is a member of Financial Action Task Force on Money Laundering (FATF); and determining strength of a banking industry in the selected country.

5. The method of claim 1, wherein determining the risk comprises:

determining if the person or other legal entity is currently being monitored with respect to financial activity;

determining a level of risk of the person or other legal entity being associated with terrorist activity;

evaluating a level of knowledge about the person or other legal entity; and determining if the person or other legal entity is known to be a high risk.

6. The method of claim 1, wherein the determining the risk rating comprises at least one of:

determining the at least one selected financial product or investment's attractiveness for use by terrorist;

evaluating the level of complexity of the at least one selected financial product or investment;

determining if the at least one selected financial product or investment is currently monitored for use with respect to illegal activity;

determining a level of the person or other legal entity's knowledge of the at least one financial product or investment; and determining a level of ease of obtaining and using the at least one financial product or investment.

7. The method of claim 1, further comprising presenting a graphical user interface using a computer processor for a user to enter a response to each of a multiplicity of criteria or questions associated with a group including the selected country, the selected financial product or investment, and the selected customer type.

8. The method of claim 7, wherein the multiplicity of criteria or questions comprises:

identifying the person or other legal entity to be evaluated;

selecting the country associated with the person or other legal entity;

selecting the at least one financial product or investment associated with the person or other legal entity; and selecting the customer type associated with the person or other legal entity.

9. The method of claim 1, wherein the determining a risk rating comprises calculating a risk rating based on a set of values, each value being assigned to one of a plurality of different possible or selectable responses or answers for each of a multiplicity of criteria or questions associated with a group including at least one of a selected country, a selected financial product or investment, and a selected customer type.

10. The method of claim 1, further comprising defining the multiplicity of criteria or questions comprising at least one of:

determining whether the selected country is cooperative;

determining if the selected country is on an Office of Foreign Asset Control (OFAC) list;

determining an International Narcotics Strategy Report Rating;

determining if the selected country is a member of the Financial Task Force on Money Laundering (FATF);

determining if the selected country was a party to a 1988 United Nations Convention on drugs;

determining a quality of local laws and regulations;

determining a level of government support related to law enforcement and prosecution of offenders;

determining a strength of the selected country's banking industry; and determining a quality of banking regulation and oversight.

11. A system to evaluate anti-money laundering risk, comprising:

a server; and a risk rating tool operable on the server, wherein the risk rating tool is adapted to determine a risk rating of a person or other legal entity to be evaluated based on responses to predetermined criteria related to a selected country associated with the person or other legal entity, at least one selected financial product associated with the person or other legal entity, and a selected customer type associated with the person or other legal entity; and wherein the risk rating tool is programmed to determine a risk rating based on responses to the predetermined criteria related to at least one selected financial product or investment, the predetermined criteria comprising a customer sophistication with respect to the selected financial product or investment;

a propensity of the selected financial product or investment for use for money laundering.

12. The system of claim 11, further comprising a value being set corresponding to each of the responses to the predetermined criteria.

13. The system of claim 12, wherein the risk rating tool is programmed to calculate one of an average or a weighted average of the values based on the selected country, the at least one selected financial product and the selected customer type.

14. The system of claim 11, wherein the risk rating tool is further programmed to determine a risk rating based on responses to predetermined criteria related to a selected customer type, the predetermined criteria comprising:
- a customer currently being monitored with respect to financial activity;
- a level of risk of the customer being involved in terrorist activity;
- a level of a financial institutions knowledge of its customer; and
- the customer being known to be a high risk.

15. The system of claim 11, wherein the risk rating tool is further programmed to calculate a risk rating based on a set of values, each value being assigned to one of a plurality of different possible or selectable responses or answers for each of a multiplicity of criteria or questions associated with a group including at least one of a selected country, a selected financial product or investment and a selected customer type.

16. The system of claim 15, further comprising a database including reports used to determine each of the set of values.

17. The system of claim 11, wherein the risk rating tool is programmed to present a graphical user interface for a user to select at least one of:
- if the selected country is a cooperative jurisdiction;
- if the selected country is on an Office of Foreign Asset Control (OFAC) list;
- an International Narcotics Strategy Report Rating associated with the selected country;
- if the selected country is a member of the Financial Task Force on Money Laundering (FATF);
- if the selected country was a party to a 1988 United Nations Convention;
- a quality of local laws and regulations associated with the selected country;
- a level of government support related to enforcement of laws and regulations and prosecution of offenses;
- a strength of a banking industry associated with the selected country; and
- a quality of banking regulation and oversight associated with the selected country.

18. The system of claim 11, wherein the predetermined criteria is selected or entered into a graphical user interface and comprises:
- a customer sophistication with respect to the selected financial product or investment;
- a propensity of the selected financial product or investment for use for money laundering;
- an attractiveness of the selected financial product or investment for use by terrorist;
- a level of complexity of the financial product or investment;
- a current monitoring of the financial product or investment for use with respect to illegal activity;
- a level of a customer's or public's knowledge of the financial product or investment; and
- a level of ease of obtaining and using the financial product or investment.

* * * * *